(12) United States Patent
Schuck et al.

(10) Patent No.: US 11,681,148 B2
(45) Date of Patent: Jun. 20, 2023

(54) COMPACT CATADIOPTRIC PROJECTOR

(71) Applicant: Snap Inc., Santa Monica, CA (US)

(72) Inventors: Miller Schuck, Erie, CO (US); Robert Matthew Bates, Erie, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/952,485

(22) Filed: Sep. 26, 2022

(65) Prior Publication Data
US 2023/0082393 A1 Mar. 16, 2023

Related U.S. Application Data

(63) Continuation of application No. 17/473,536, filed on Sep. 13, 2021, now Pat. No. 11,480,800.

(51) Int. Cl.
| | |
|---|---|
| *G02B 27/01* | (2006.01) |
| *G02B 27/28* | (2006.01) |
| *G09G 3/00* | (2006.01) |
| *G02B 5/30* | (2006.01) |
| *G02C 11/00* | (2006.01) |

(Continued)

(52) U.S. Cl.
CPC ....... *G02B 27/0172* (2013.01); *G02B 5/3083* (2013.01); *G02B 27/283* (2013.01); *G02C 11/10* (2013.01); *G09G 3/002* (2013.01); *G02B 2027/014* (2013.01); *G02B 2027/0178* (2013.01); *G06F 3/012* (2013.01); *G06F 3/013* (2013.01); *H04N 13/239* (2018.05)

(58) Field of Classification Search
CPC .............. G02B 27/0172; G02B 5/3083; G02B 27/283; G02B 2027/014; G02B 2027/0178; G02C 11/10; G09G 3/002; H04N 13/239; G06F 3/012; G06F 3/013
See application file for complete search history.

(56) References Cited

U.S. PATENT DOCUMENTS

| | | | |
|---|---|---|---|
| 10,545,348 B1 * | 1/2020 | Lu | G02B 6/0056 |
| 11,480,800 B1 | 10/2022 | Schuck et al. | |
| 2002/0167733 A1 | 11/2002 | Roest | |

(Continued)

OTHER PUBLICATIONS

International Search Report and Written Opinion for International Application No. PCT/US2022/041826, dated Nov. 30, 2022 (Nov. 30, 2022)—9 pages.

*Primary Examiner* — Hang Lin
(74) *Attorney, Agent, or Firm* — Culhane Meadows PLLC; Stephen J. Weed

(57) ABSTRACT

A compact projector for eyewear including a refractive lens to achromatize an image and to reduce the size of the projector. The compact projector includes two total internal reflection (TIR) prisms, a polarizing beamsplitter, a quarter-wave plate, and the refractive lens combining refractive and reflective power, referred to as catadioptric. In one example, a light source generates light that is directed through a collector, into a first TIR prism, to the polarizing beamsplitter, and to a display panel. The display panel modulates the light and creates an image. The image is directed through the beamsplitter, into a second TIR prism, through a quarter-wave plate, and then to the refractive lens. The refractive lens reflects the image back into the second TIR prism, and which image then exits to a waveguide. In a second example, the display generates an illuminated image which is then processed as in the first example.

20 Claims, 18 Drawing Sheets

(51) Int. Cl.
   *G06F 3/01*       (2006.01)
   *H04N 13/239*     (2018.01)

(56) References Cited

U.S. PATENT DOCUMENTS

| | | |
|---|---|---|
| 2014/0118813 A1 | 5/2014 | Amitai et al. |
| 2019/0179149 A1* | 6/2019 | Curtis ................ G02B 6/0076 |
| 2019/0391408 A1 | 12/2019 | Mansharof |
| 2021/0103140 A1 | 4/2021 | Gao et al. |

* cited by examiner

COMPACT CATADIOPTRIC PROJECTOR

CROSS-REFERENCE TO RELATED APPLICATIONS

This application is a Continuation of U.S. application Ser. No. 17/473,536 filed on Sep. 13, 2021, the contents of which are incorporated fully herein by reference.

TECHNICAL FIELD

The present subject matter relates to the field of projectors.

BACKGROUND

Many types of projectors generate an image that is viewable to a user, such as used in an eyewear device.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1A:
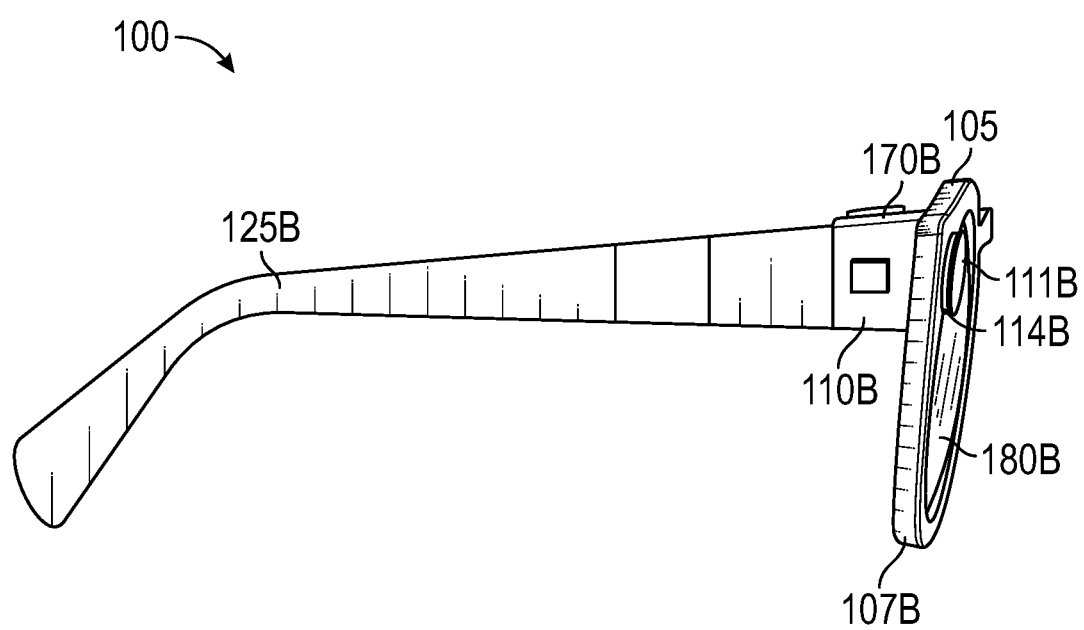
FIG. 1A is a side view of an example hardware configuration of an eyewear device, which shows a right optical assembly with an image display, and field of view adjustments are applied to a user interface presented on the image display based on detected head or eye movement by a user.

This disclosure is directed to a compact projector for eyewear including a refractive lens to achromatize an image and to reduce the size of the projector. The compact projector includes two total internal reflection (TIR) prisms, a polarizing beamsplitter, a quarter-wave plate, and the refractive lens combining refractive and reflective power, referred to as catadioptric. In one example, a light source generates light that is directed through a collector, into a first TIR prism, to the polarizing beamsplitter, and to a display panel. The display panel modulates the light and creates an image. The image is directed through the beamsplitter, into a second TIR prism, through a quarter-wave plate, and then to the refractive lens. The refractive lens reflects the image back into the second TIR prism, and which image then exits to a waveguide. In a second example, the display generates an illuminated image which is then processed as in the first example.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below.

Figure 2A:
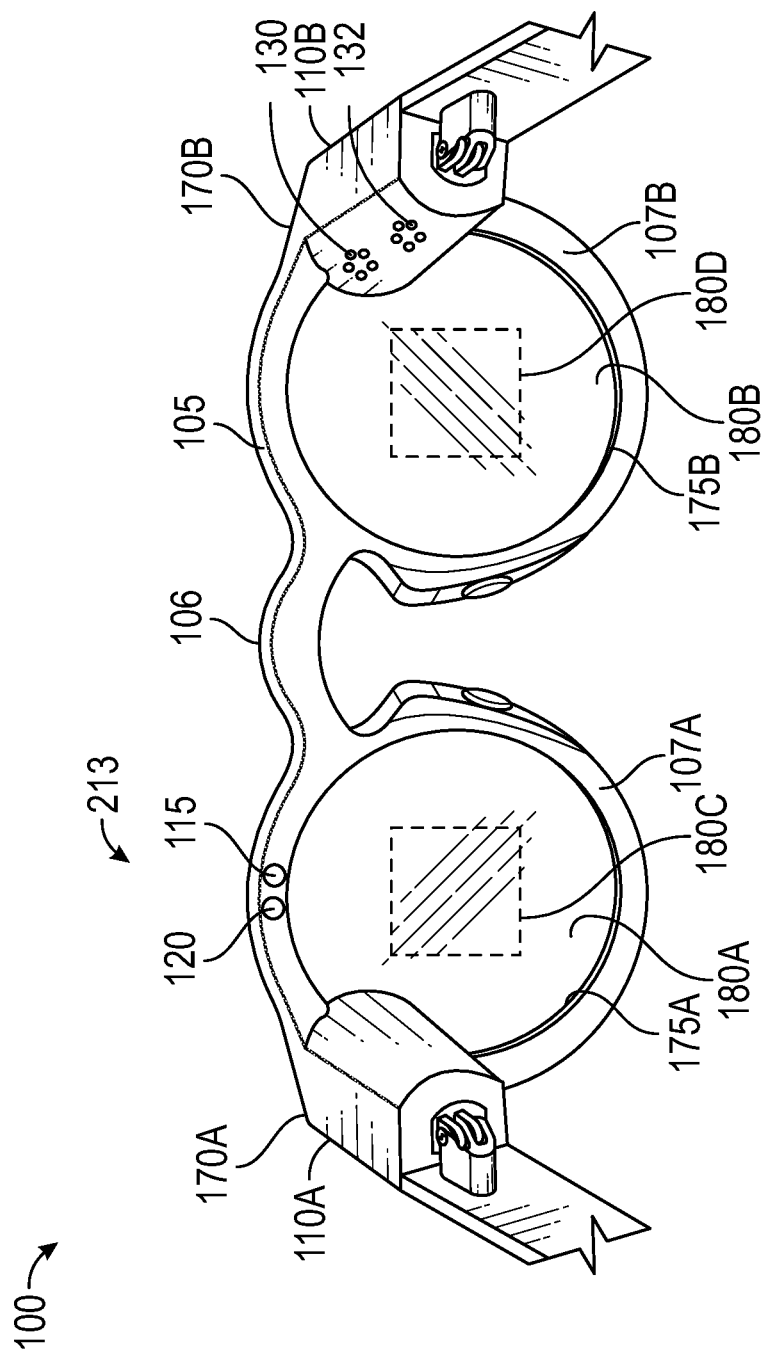
FIG. 2A is a rear view of an example hardware configuration of an eyewear device, which includes an eye scanner on a frame, for use in a system for identifying a user of the eyewear device.

FIG. 1A is a side view of an example hardware configuration of an eyewear device 100, which includes a right optical assembly 180B with an image display 180D (FIG. 2A). Eyewear device 100 includes multiple visible light cameras 114A-B (FIG. 7) that form a stereo camera, of which the right visible light camera 114B is located on a right temple 110B.

The left and right visible light cameras 114A-B have an image sensor that is sensitive to the visible light range wavelength. Each of the visible light cameras 114A-B have a different frontward facing angle of coverage, for example, visible light camera 114B has the depicted angle of coverage 111B. The angle of coverage is an angle range which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B are captured along with geolocation data, digitized by an image processor, and stored in a memory.

To provide stereoscopic vision, visible light cameras 114A-B may be coupled to an image processor (element 912 of FIG. 9) for digital processing along with a timestamp in which the image of the scene is captured. Image processor 912 includes circuitry to receive signals from the visible light camera 114A-B and process those signals from the visible light cameras 114A-B into a format suitable for storage in the memory (element 934 of FIG. 9). The timestamp can be added by the image processor 912 or other processor, which controls operation of the visible light cameras 114A-B. Visible light cameras 114A-B allow the stereo camera to simulate human binocular vision. Stereo cameras provide the ability to reproduce three-dimensional images (element 715 of FIG. 7) based on two captured images (elements 758A-B of FIG. 7) from the visible light cameras 114A-B, respectively, having the same timestamp. Such three-dimensional images 715 allow for an immersive life-like experience, e.g., for virtual reality or video gaming. For stereoscopic vision, the pair of images 758A-B are generated at a given moment in time—one image for each of the left and right visible light cameras 114A-B. When the pair of generated images 758A-B from the frontward facing field of view (FOV) 111A-B of the left and right visible light cameras 114A-B are stitched together (e.g., by the image processor 912), depth perception is provided by the optical assembly 180A-B.

In an example, a user interface field of view adjustment system includes the eyewear device 100. The eyewear device 100 includes a frame 105, a right temple 110B extending from a right lateral side 170B of the frame 105, and a see-through image display 180D (FIGS. 2A-B) comprising optical assembly 180B to present a graphical user interface to a user. The eyewear device 100 includes the left visible light camera 114A connected to the frame 105 or the left temple 110A to capture a first image of the scene. Eyewear device 100 further includes the right visible light camera 114B connected to the frame 105 or the right temple 110B to capture (e.g., simultaneously with the left visible light camera 114A) a second image of the scene which partially overlaps the first image. Although not shown in FIGS. 1A-B, the user interface field of view adjustment system further includes the processor 932 coupled to the eyewear device 100 and connected to the visible light cameras 114A-B, the memory 934 accessible to the processor 932, and programming in the memory 934, for example in the eyewear device 100 itself or another part of the user interface field of view adjustment system.

Figure 1B:
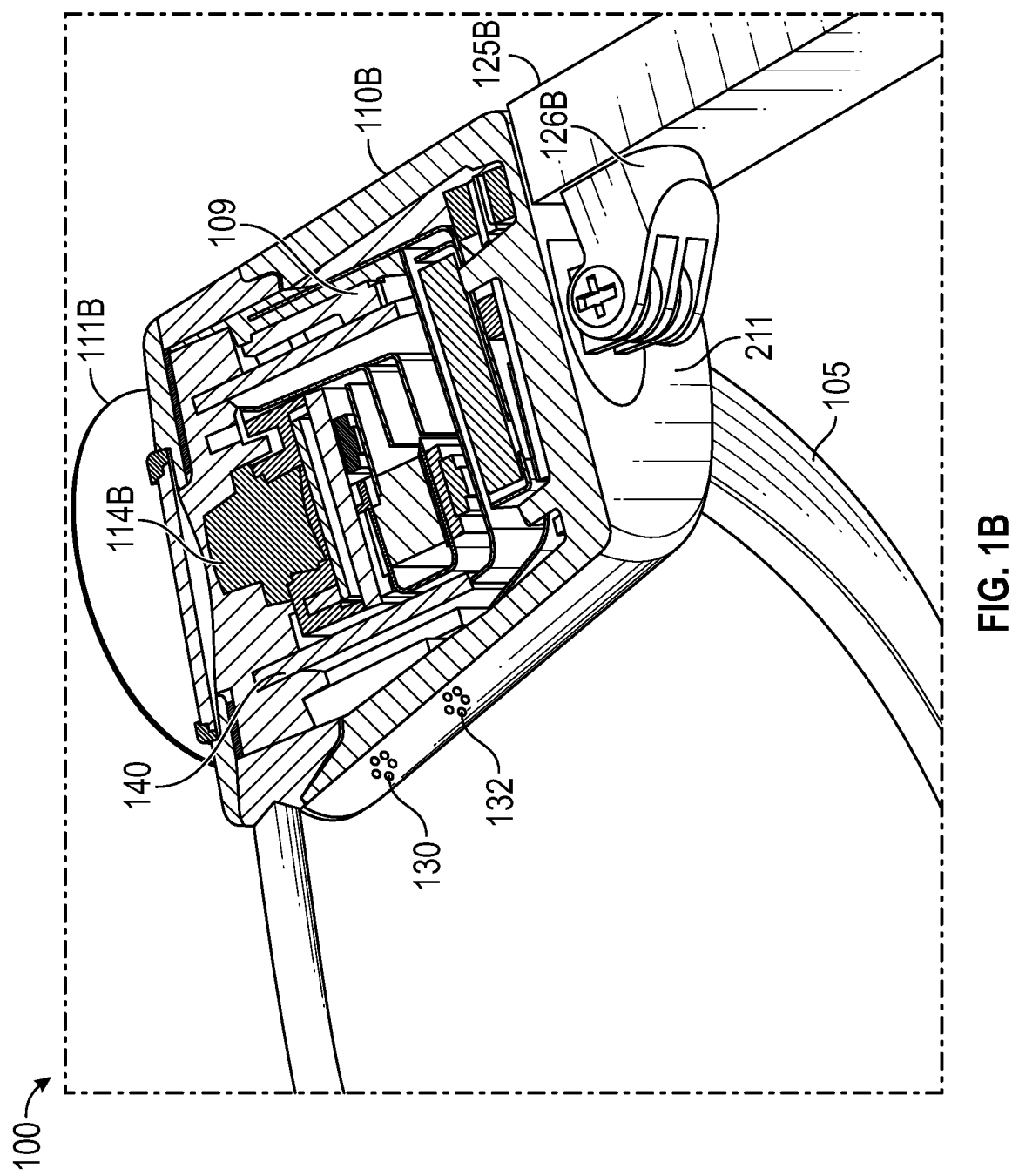
FIG. 1B is a top cross-sectional view of a temple of the eyewear device of FIG. 1A depicting a visible light camera, a head movement tracker for tracking the head movement of the user of the eyewear device, and a circuit board.
Figure 2B:
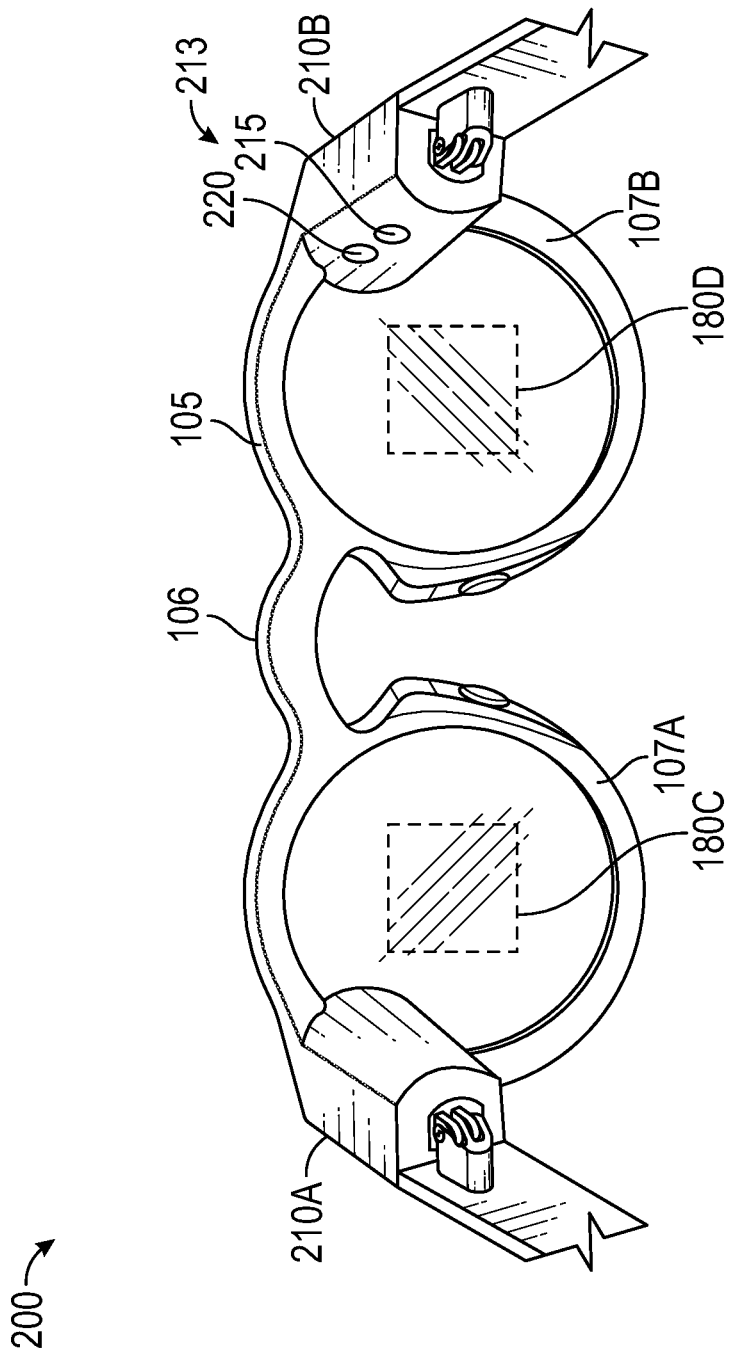
FIG. 2B is a rear view of an example hardware configuration of another eyewear device, which includes an eye scanner on a temple, for use in a system for identifying a user of the eyewear device.

Although not shown in FIG. 1A, the eyewear device 100 also includes a head movement tracker (element 109 of FIG. 1B) or an eye movement tracker (element 213 of FIG. 2B). Eyewear device 100 further includes the see-through image displays 180C-D of optical assembly 180A-B, respectfully, for presenting a sequence of displayed images, and an image display driver (element 942 of FIG. 9) coupled to the see-through image displays 180C-D of optical assembly 180A-B to control the image displays 180C-D of optical assembly 180A-B to present the sequence of displayed images 715, which are described in further detail below. Eyewear device 100 further includes the memory 934 and the processor 932 having access to the image display driver 942 and the memory 934. Eyewear device 100 further includes programming (element 934 of FIG. 9) in the memory. Execution of the programming by the processor 932 configures the eyewear device 100 to perform functions, including functions to present, via the see-through image displays 180C-D, an initial displayed image of the sequence of displayed images, the initial displayed image having an initial field of view corresponding to an initial head direction or an initial eye gaze direction (element 230 of FIG. 5).

Execution of the programming by the processor 932 further configures the eyewear device 100 to detect movement of a user of the eyewear device by: (i) tracking, via the head movement tracker (element 109 of FIG. 1B), a head movement of a head of the user, or (ii) tracking, via an eye movement tracker (element 213 of FIG. 2B, FIG. 5), an eye movement of an eye of the user of the eyewear device 100. Execution of the programming by the processor 932 further configures the eyewear device 100 to determine a field of view adjustment to the initial field of view of the initial displayed image based on the detected movement of the user. The field of view adjustment includes a successive field of view corresponding to a successive head direction or a successive eye direction. Execution of the programming by the processor 932 further configures the eyewear device 100 to generate a successive displayed image of the sequence of displayed images based on the field of view adjustment. Execution of the programming by the processor 932 further configures the eyewear device 100 to present, via the see-through image displays 180C-D of the optical assembly 180A-B, the successive displayed images.

FIG. 1B is a top cross-sectional view of the temple of the eyewear device 100 of FIG. 1A depicting the right visible light camera 114B, a head movement tracker 109, and a circuit board. Construction and placement of the left visible light camera 114A is substantially similar to the right visible light camera 114B, except the connections and coupling are on the left lateral side 170A. As shown, the eyewear device 100 includes the right visible light camera 114B and a circuit board, which may be a flexible printed circuit board (PCB) 140. The left hinge 126A connects the left temple 110A to a left temple extension 125A of the eyewear device 100. In some examples, components of the left visible light camera 114A, the flexible PCB 140, or other electrical connectors or contacts may be located on the left temple extension 125A or the left hinge 126A. The right hinge 126B connects the right temple 110B to a right temple extension 125B of the eyewear device 100. In some examples, components of the right visible light camera 114B, the flexible PCB 140, or other electrical connectors or contacts may be located on the right temple extension 125B or the right hinge 126B.

As shown, eyewear device 100 has a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass which generates a heading reference. The three accelerometers to detect acceleration along the horizontal, vertical, and depth axis defined above, which can be defined relative to the ground, the eyewear device 100, or the user wearing the eyewear device 100.

Eyewear device 100 detects movement of the user of the eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user further includes determining the variation of head direction based on both the initial head direction and the successive head direction. Detecting movement of the user of the eyewear device 100 further includes in response to tracking, via the head movement tracker 109, the head movement of the head of the user, determining that the variation of head direction exceeds a deviation angle threshold on the horizontal axis, the vertical axis, or the combination thereof. The deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the eyewear device 100 may power down.

The right temple 110B includes temple body 211 and a temple cap, with the temple cap omitted in the cross-section of FIG. 1B. Disposed inside the right temple 110B are various interconnected circuit boards, such as PCBs or flexible PCBs, that include controller circuits for right visible light camera 114B, microphone(s) 130, speaker(s) 132, low-power wireless circuitry (e.g., for wireless short-range network communication via Bluetooth™), high-speed wireless circuitry (e.g., for wireless local area network communication via WiFi).

The right visible light camera 114B is coupled to or disposed on the flexible PCB 240 and covered by a visible light camera cover lens, which is aimed through opening(s) formed in the right temple 110B. In some examples, the frame 105 connected to the right temple 110B includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outward facing angle of coverage 111B with a line of sight or perspective of the right eye of the user of the eyewear device 100. The visible light camera cover lens can also be adhered to an outward facing surface of the right temple 110B in which an opening is formed with an outwards facing angle of coverage, but in a different outwards direction. The coupling can also be indirect via intervening components.

Left (first) visible light camera 114A is connected to the left see-through image display 180C of left optical assembly 180A to generate a first background scene of a first successive displayed image. The right (second) visible light camera 114B is connected to the right see-through image display 180D of right optical assembly 180B to generate a second background scene of a second successive displayed image. The first background scene and the second background scene partially overlap to present a three-dimensional observable area of the successive displayed image.

Flexible PCB 140 is disposed inside the right temple 110B and is coupled to one or more other components housed in the right temple 110B. Although shown as being formed on the circuit boards of the right temple 110B, the right visible light camera 114B can be formed on the circuit boards of the left temple 110A, the temples 125A-B, or frame 105.

FIG. 2A is a rear view of an example hardware configuration of an eyewear device 100, which includes an eye scanner 213 on a frame 105, for use in a system for determining an eye position and gaze direction of a wearer/user of the eyewear device 100. As shown in FIG. 2A, the eyewear device 100 is in a form configured for wearing by a user, which are eyeglasses in the example of FIG. 2A. The eyewear device 100 can take other forms and may incorporate other types of frameworks, for example, a headgear, a headset, or a helmet.

In the eyeglasses example, eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the eyewear device 100 can include other arrangements, such as a single optical element depending on the application or intended user of the eyewear device 100. As further shown, eyewear device 100 includes the left temple 110A adjacent the left lateral side 170A of the frame 105 and the right temple 110B adjacent the right lateral side 170B of the frame 105. The temples 110A-B may be integrated into the frame 105 on the respective sides 170A-B (as illustrated) or implemented as separate components attached to the frame 105 on the respective sides 170A-B. Alternatively, the temples 110A-B may be integrated into temples (not shown) attached to the frame 105.

In the example of FIG. 2A, the eye scanner 213 includes an infrared emitter 115 and an infrared camera 120. Visible light cameras typically include a blue light filter to block infrared light detection, in an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 are co-located on the frame 105, for example, both are shown as connected to the upper portion of the left rim 107A. The frame 105 or one or more of the left and right temples 110A-B include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 can be implemented, including arrangements in which the infrared emitter 115 and infrared camera 120 are both on the right rim 107B, or in different locations on the frame 105, for example, the infrared emitter 115 is on the left rim 107A and the infrared camera 120 is on the right rim 107B. In another example, the infrared emitter 115 is on the frame 105 and the infrared camera 120 is on one of the temples 110A-B, or vice versa. The infrared emitter 115 can be connected essentially anywhere on the frame 105, left temple 110A, or right temple 110B to emit a pattern of infrared light. Similarly, the infrared camera 120 can be connected essentially anywhere on the frame 105, left temple 110A, or right temple 110B to capture at least one reflection variation in the emitted pattern of infrared light.

The infrared emitter 115 and infrared camera 120 are arranged to face inwards towards an eye of the user with a partial or full field of view of the eye in order to identify the respective eye position and gaze direction. For example, the infrared emitter 115 and infrared camera 120 are positioned directly in front of the eye, in the upper part of the frame 105 or in the temples 110A-B at either ends of the frame 105.

FIG. 2B is a rear view of an example hardware configuration of another eyewear device 200. In this example configuration, the eyewear device 200 is depicted as including an eye scanner 213 on a right temple 210B. As shown, an infrared emitter 215 and an infrared camera 220 are co-located on the right temple 210B. It should be understood that the eye scanner 213 or one or more components of the eye scanner 213 can be located on the left temple 210A and other locations of the eyewear device 200, for example, the frame 105. The infrared emitter 215 and infrared camera 220 are like that of FIG. 2A, but the eye scanner 213 can be varied to be sensitive to different light wavelengths as described previously in FIG. 2A.

Similar to FIG. 2A, the eyewear device 200 includes a frame 105 which includes a left rim 107A which is connected to a right rim 107B via a bridge 106; and the left and right rims 107A-B include respective apertures which hold the respective optical elements 180A-B comprising the see-through display 180C-D.

Figure 2C:
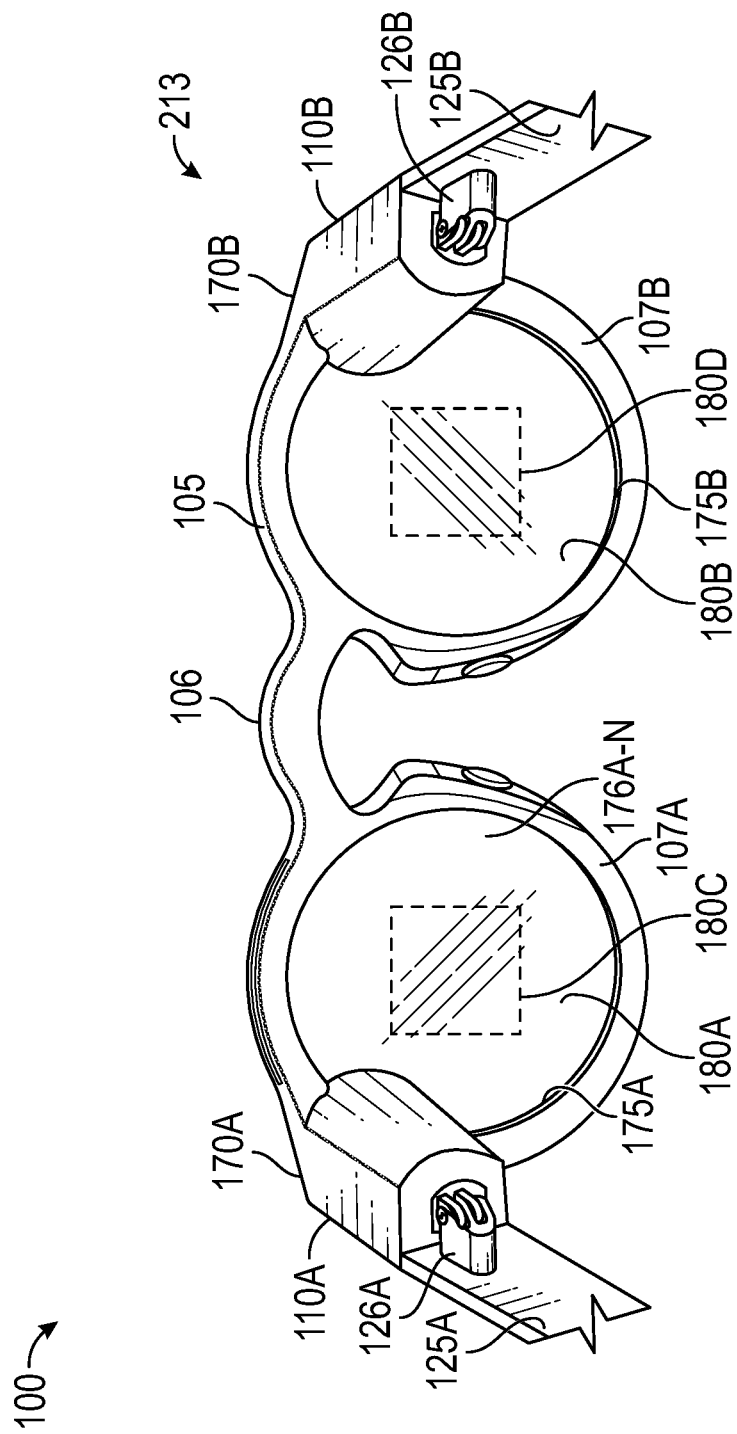
FIGS. 2C and 2D are rear views of example hardware configurations of the eyewear device, including two different types of image displays.
Figure 2D:
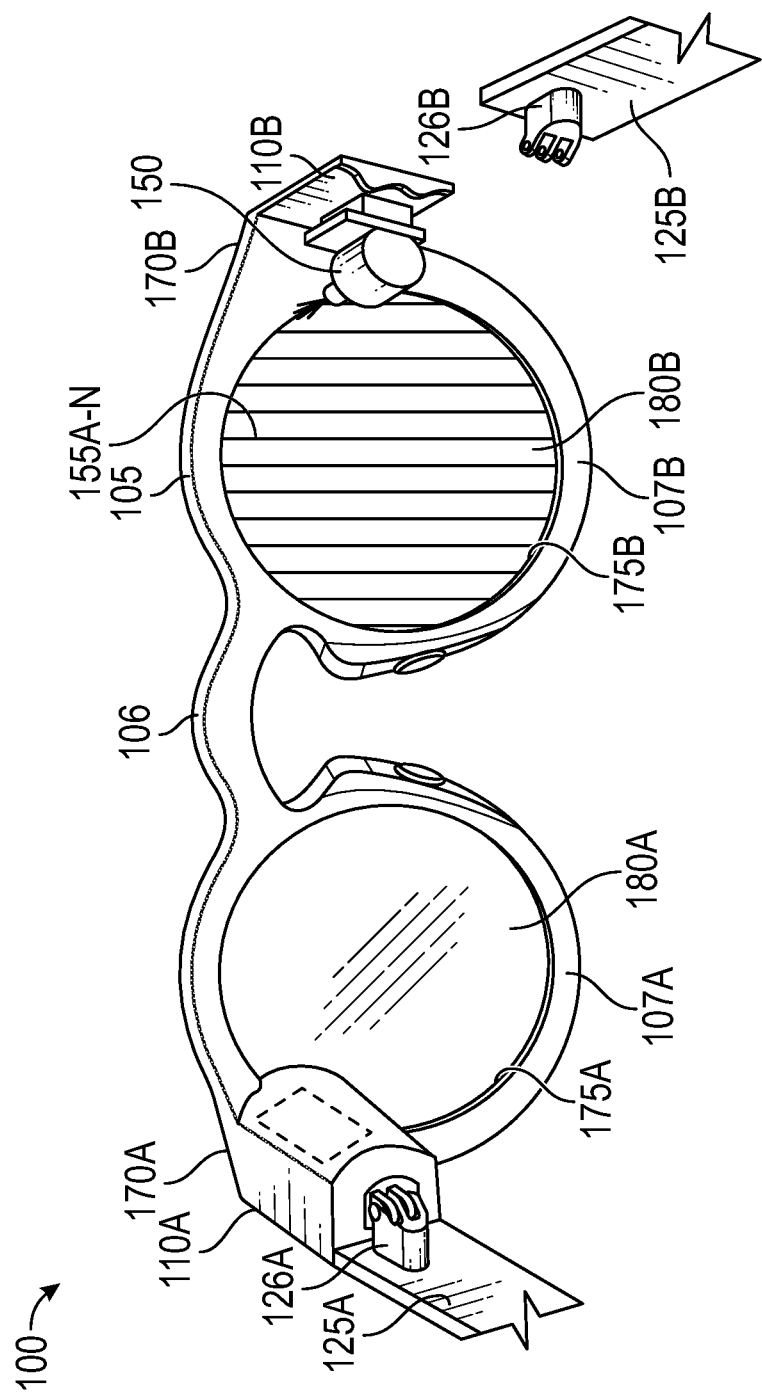

FIGS. 2C-D are rear views of example hardware configurations of the eyewear device 100, including two different types of see-through image displays 180C-D. In one example, these see-through image displays 180C-D of optical assembly 180A-B include an integrated image display. As shown in FIG. 2C, the optical assemblies 180A-B includes a suitable display matrix 180C-D of any suitable type, such as a liquid crystal display (LCD), an organic light-emitting diode (OLED) display, a waveguide display, or any other such display.

The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B include a projection image display as shown in FIG. 2D. The optical assembly 180A-B includes a projector 150, which may be a three-color projector using a scanning mirror, a galvanometer, a laser projector, or other types of projectors. During operation, an optical source such as a projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens. A detailed example of a projector is shown in FIGS. 8A-8J.

As the photons projected by the projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of projector 150, and modulation of optical strips, may control specific photons or beams of light. In an example, a processor 932 (FIG. 9) controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2C-D, eyewear device 100 includes a left temple 110A adjacent the left lateral side 170A of the frame 105 and a right temple 110B adjacent the right lateral side 170B of the frame 105. The temples 110A-B may be integrated into the frame 105 on the respective lateral sides 170A-B (as illustrated) or implemented as separate components attached to the frame 105 on the respective sides 170A-B. Alternatively, the temples 110A-B may be integrated into temples 125A-B attached to the frame 105.

In one example, the see-through image displays include the first see-through image display 180C and the second see-through image display 180D. Eyewear device 100 includes first and second apertures 175A-B which hold the respective first and second optical assembly 180A-B. The first optical assembly 180A includes the first see-through image display 180C (e.g., a display matrix of FIG. 2C or optical strips 155A-N and a projector 150). The second optical assembly 180B includes the second see-through image display 180D, e.g., a display matrix of FIG. 2C or optical strips 155A-N and a projector 150). The successive field of view of the successive displayed image includes an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
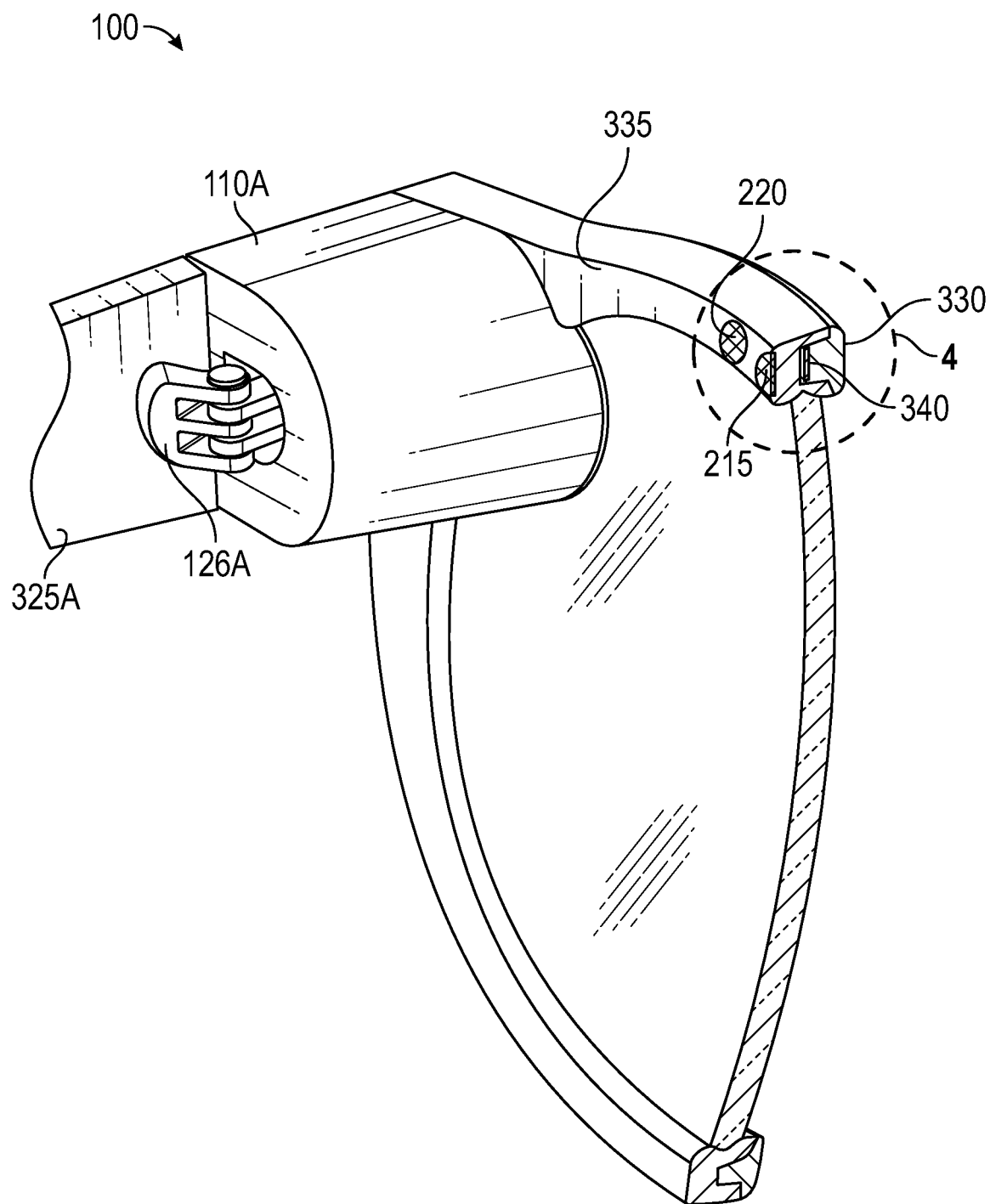
FIG. 3 shows a rear perspective view of the eyewear device of FIG. 2A depicting an infrared emitter, an infrared camera, a frame front, a frame back, and a circuit board.

FIG. 3 shows a rear perspective view of the eyewear device of FIG. 2A. The eyewear device 100 includes an infrared emitter 215, infrared camera 220, a frame front 330, a frame back 335, and a circuit board 340. It can be seen in FIG. 3 that the upper portion of the left rim of the frame of the eyewear device 100 includes the frame front 330 and the frame back 335. An opening for the infrared emitter 215 is formed on the frame back 335.

As shown in the encircled cross-section 4 in the upper middle portion of the left rim of the frame, a circuit board, which is a flexible PCB 340, is sandwiched between the frame front 330 and the frame back 335. Also shown in further detail is the attachment of the left temple 110A to the left temple 325A via the left hinge 126A. In some examples, components of the eye movement tracker 213, including the infrared emitter 215, the flexible PCB 340, or other electrical connectors or contacts may be located on the left temple 325A or the left hinge 126A.

Figure 4:
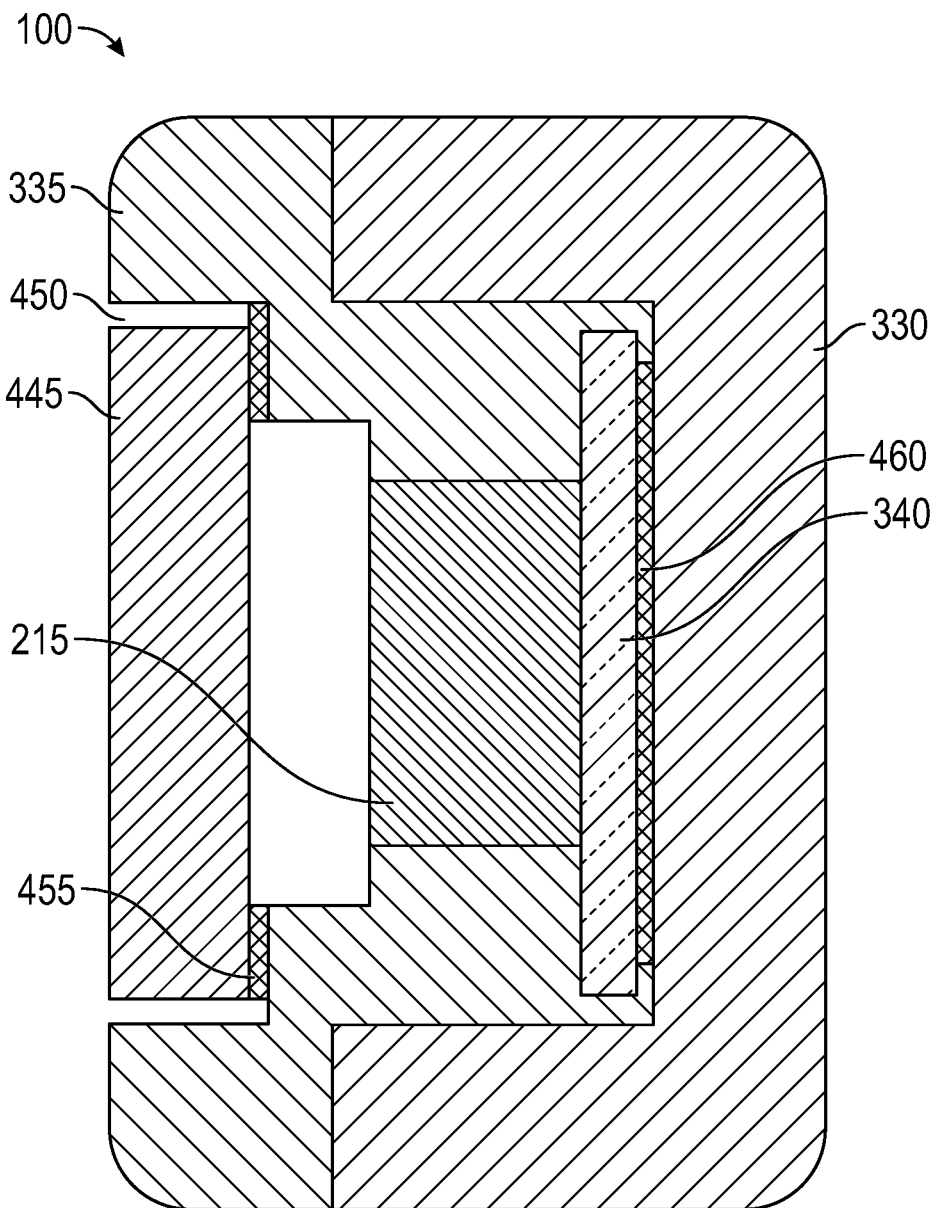
FIG. 4 is a cross-sectional view taken through the infrared emitter and the frame of the eyewear device of FIG. 3.

FIG. 4 is a cross-sectional view through the infrared emitter 215 and the frame corresponding to the encircled cross-section 4 of the eyewear device of FIG. 3. Multiple layers of the eyewear device 100 are illustrated in the cross-section of FIG. 4, as shown the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 includes an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling can also be indirect via intervening components.

Figure 5:
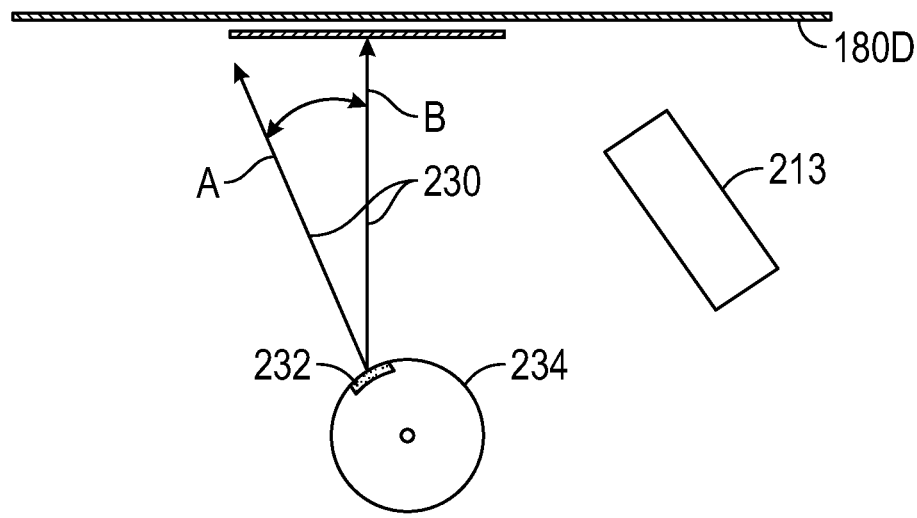
FIG. 5 illustrates detecting eye gaze direction.
Figure 6:
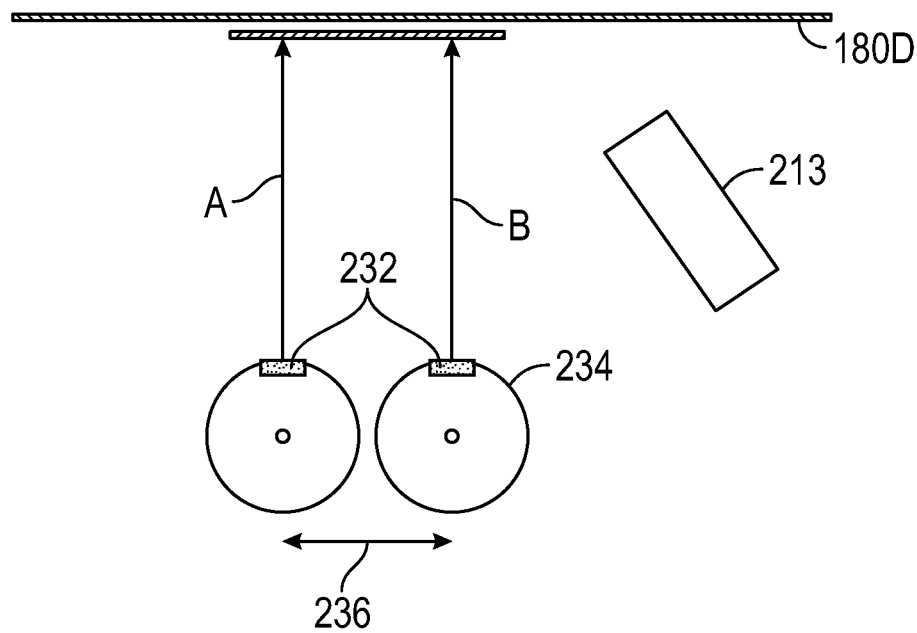
FIG. 6 illustrates detecting eye position.

In an example, the processor 932 utilizes eye tracker 213 to determine an eye gaze direction 230 of a wearer's eye 234 as shown in FIG. 5, and an eye position 236 of the wearer's eye 234 within an eyebox as shown in FIG. 6. The eye tracker 213 is a scanner which uses infrared light illumination (e.g., near-infrared, short-wavelength infrared, mid-wavelength infrared, long-wavelength infrared, or far infrared) to captured image of reflection variations of infrared light from the eye 234 to determine the gaze direction 230 of a pupil 232 of the eye 234, and also the eye position 236 with respect to the see-through display 180D.

Figure 7:
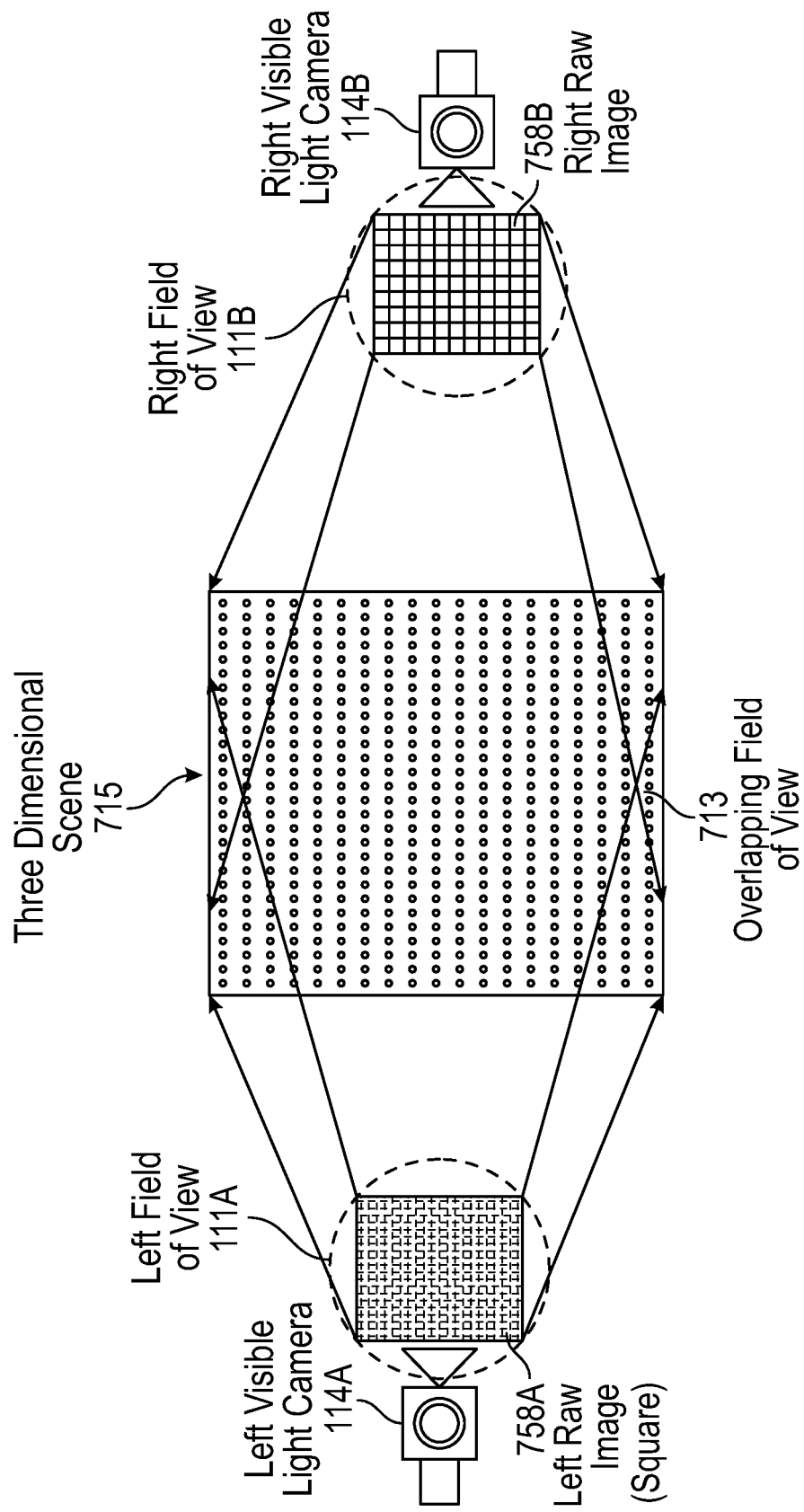
FIG. 7 depicts an example of visible light captured by the left visible light camera as a left raw image and visible light captured by the right visible light camera as a right raw image.
Figure 9:
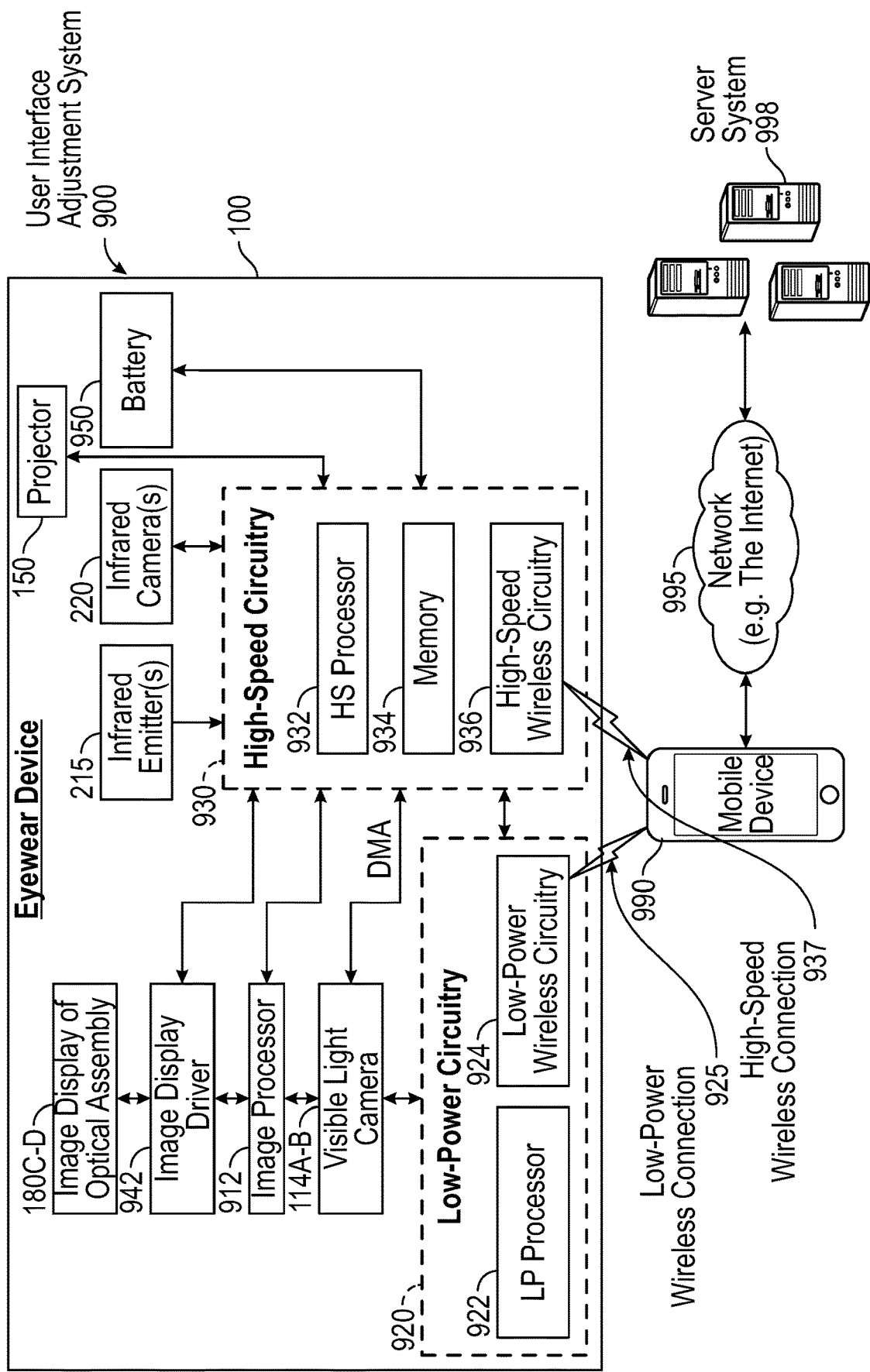
FIG. 9 illustrates a block diagram of electronic components of the eyewear device including the projector.

FIG. 7 depicts an example of capturing visible light with cameras 114A-B. Visible light is captured by the left visible light camera 114A with a round field of view (FOV). 111A. A chosen rectangular left raw image 758A is used for image processing by image processor 912 (FIG. 9). Visible light is captured by the right visible light camera 114B with a round FOV 111B having an overlap 713 with FOV 111A. A rectangular right raw image 758B chosen by the image processor 912 is used for image processing by processor 912. Based on processing of the left raw image 758A and the right raw image 758B, a three-dimensional image 715 of a three-dimensional scene, referred to hereafter as an immersive image, is generated by processor 912 and displayed by displays 180C and 180D and which is viewable by the user.

Augmented reality (AR) devices often employ waveguide combiners in front of the user's eye to create a virtual image that overlays the image of the real world passing through the combiner. Light that makes up the virtual image is injected into the waveguide by an input coupling mechanism, for example a diffraction grating or prism, and propagates through the waveguide via total internal reflection (TIR). The light is then extracted from the waveguide by an output coupling mechanism (e.g. a diffraction grating) and forms a pupil some distance from the waveguide where a user can position their eye to view the virtual image.

Figure 8A:
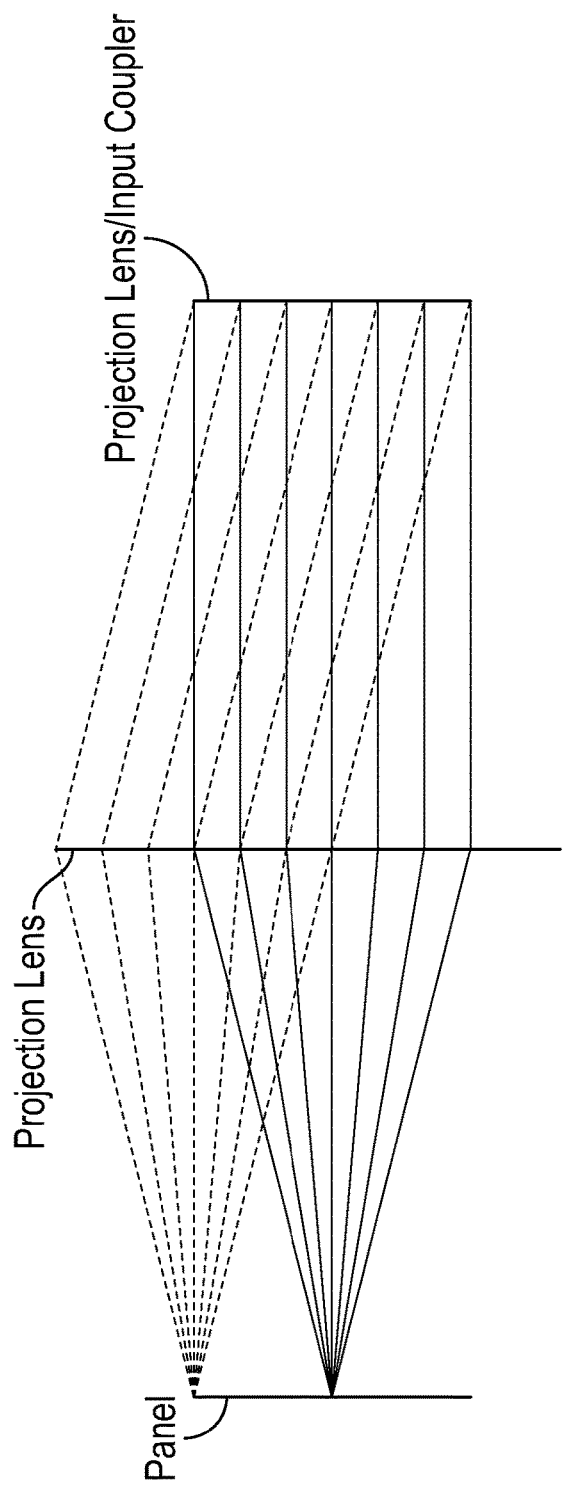
FIG. 8A illustrates forming a virtual image and pupil, a display device and projector are positioned such that the exit pupil of the projector is collocated with the input coupler of the waveguide.

Referring to FIG. 8A, to form the virtual image and pupil, a display device and projector are positioned such that the exit pupil of the projector is collocated with the input coupler of the waveguide. The projection lens, in this case, acts as a Fourier transform lens which images the display panel and creates an angular distribution of pixels at the projector exit pupil from the panel's spatial pixels.

Figure 8B:
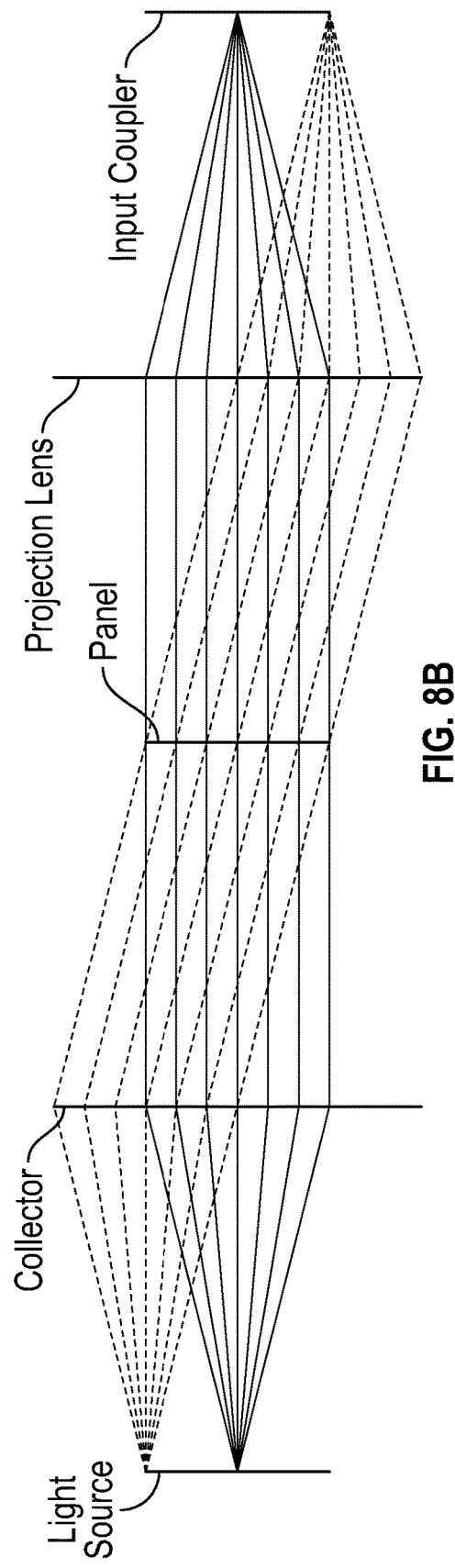
FIG. 8B illustrates when the display panel requires external illumination, a second Fourier transform lens (collector) employed to capture the illumination from a light source.

Referring to FIG. 8B, when the display panel requires external illumination, as in a Liquid-Crystal-on-Silicon (LCoS) based architecture, a second Fourier transform lens (collector) can be employed to capture the illumination from a light source. The system then can be thought of as two Fourier transform lenses (or two relay lens halves) with a display panel at the aperture stop. The light source is then imaged at the input coupler of the waveguide.

Figure 8C:
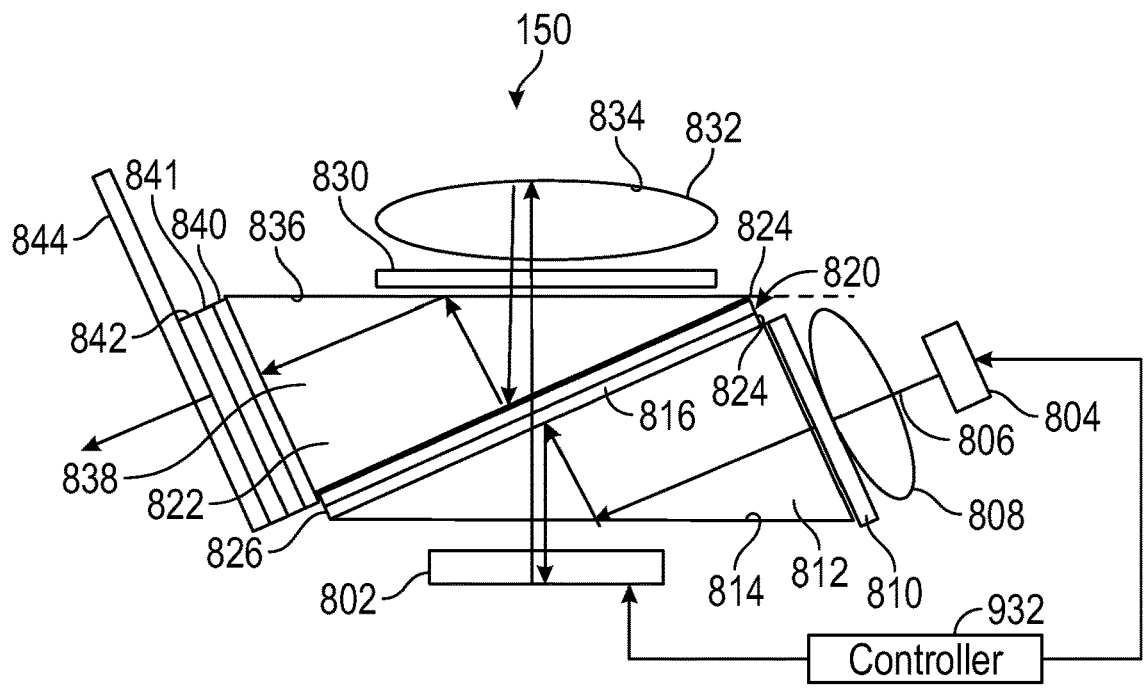
FIG. 8C illustrates a diagram of a compact projector.

Referring to FIG. 8C, there is shown a compact projector 150 based on a TIR polarizing beamsplitter prism, and a mirrored lens imaging system which combines refractive and reflective power (often called catadioptric). FIG. 8C illustrates a projector 150 using a display panel comprising a LCoS spatial light modulator, although in other examples, different light panels can be used, such as a Digital Light Processing (DLP®) manufactured by Texas Instruments of Dallas, Tex., an Organic Light Emitting Diode (OLED), or micro-Light Emitting Diode (uLED) display as will be described shortly.

FIG. 8C depicts the architecture of a compact projector 150 according to this disclosure using a LCoS display panel 802. Emitted light 806, such as red, green, and blue (RGB) light, is generated from a light source 804, such as a light emitting diode (LED), which is controlled by processor 932 (FIG. 9). The light 806 is collected by a collector 808, such as a compound parabolic concentrator and collection lens. The light 806 passes through a linear polarizer 810 and enters a right face of a lower TIR prism 812. The light 806 totally internally reflects from a lower surface 814 of the lower TIR prism 812 and is directed toward an upper surface 816 of the lower TIR prism 812. At the upper surface 816 of the lower TIR prism 812 is a polarizing beamsplitter (PBS) element 820, such as a thin film deposition or a polymer film material, such as PBS-1000 made by 3M of St. Paul, Minn. The PBS element 820 reflects light of one linear polarization and transmits light of the orthogonal linear polarization. In this case, the input linear polarizer 810 is oriented such that the light 806 entering the lower TIR prism 812 and reaching the PBS element 820 is s-polarized (instead of p-polarized). The PBS element 820 reflects the s-polarized light and directs it to the LCoS panel 802 which is controlled by processor 932.

The LCoS panel 802 operates as a quarter wave plate (QWP) and mirror when pixels of the LCoS panel 802 are set to the bright state. In this case, s-polarized light enters the LCoS panel 802, is rotated by the QWP and mirror to the orthogonal p-state, and then is directed back to the PBS element 820. The PBS element 820 transmits the p-state light and passes it to an upper TIR prism 822. Note that the PBS element 820 includes two PBS films 824 sandwiching a linear polarizer 826. This sandwich enhances the contrast of the device, but is not necessary for operation, and only one PBS film 824 may be used.

When the LCoS panel 802 pixels are set to the dark state, the panel acts as a simple mirror. The s-polarized light is reflected back to the PBS element 820. The PBS element 820 reflects the s-polarized light and sends it back through the lower TIR prism 812 to the light source 804. This s-polarized light never reaches the waveguide and therefore constitutes a dark pixel.

When the LCoS panel 802 pixels are in the bright state, the p-light from the LCoS panel 802 passes through the upper TIR prism 822 and to a quarter-wave plate 830. The quarter-wave plate 830 changes the state of the light 806 from linear to circular. The quarter-wave plate 830 can be a stack of retardation films laminated to generate an achromatic quarter-wave (AQW) response to red, green, and blue light. Other forms of AQW fabricated by liquid-crystal polymers can be used as well.

The circularly polarized light 806 then passes through a refractive lens 832. The refractive lens 832 has a mirror coating 834 on the backside of the lens 832 to act as a mirror. This type of refractive lens is often termed a Mangin lens (although Mangin lenses typically are associated with negative lens power in the refractive portion of the element). The circularly polarized light 806 changes handedness upon reflection at the mirror 834, and then travels back to the quarter-wave plate 830, gathering geometric optical power as it propagates. This catadioptric lens serves as the projection lens. The circularly polarized light 806 passes again through the quarter-wave plate 830 and becomes s-polarized light. The s-polarized light reflects at the PBS element 820 and is sent to an upper edge 836 of the upper TIR prism 822. The light 806 then reflects at the upper edge 836 and is sent out an exit port 838 being the left face of the upper TIR prism 822. Note that the quarter-wave plate 830 may be laminated to the upper TIR prism 822 for reduced reflections and higher contrast, or it may be a separate element which enhances image quality by using the high-quality prism surface as the TIR reflector.

Light 806 exiting the exit port 838 of the upper TIR prism 822 may be sent through an additional lens 840, such as a field lens (but functioning more as a pupil lens), and then through a circular or linear polarizer 841. The system creates a Fourier transform of the LCoS panel 802 which is collocated with an input coupler 842 of a waveguide 844. The input coupler 842 may be a small grating on the opposite side of the waveguide 844 from the prism assembly. The input coupler 842 could also be a prism attached to the waveguide 844 which injects light into the waveguide 844 at an angle such that the light TIR's inside the waveguide 844.

A field lens may also be inserted between the lower TIR prism 812 and LCoS panel 802 to improve the system modulation transfer function (MTF) and lower image distortion.

This TIR PBS prism assembly and catadioptric image system creates a very compact LCoS projector 150 suitable for injection of an image into the waveguide 844.

The basic architecture described above could also be used with other display panels, with some simplification but potentially some light loss. For example, a uLED display panel emits light directly from its pixels. The uLED display panel can be placed in the same position as the LCoS display panel 802, and light can be emitted toward the PBS element 820. Light in the p-polarized state would pass through the PBS element 820, to the quarter-wave plate 830, to the Mangin lens 832, and back through the quarter-wave plate 830 where it becomes s-polarized. The s-polarized light then reflects from the PBS element 820, reflects at the upper edge 836 of the upper TIR prism 822, and creates a Fourier transform of the uLED panel pixels at the input coupler. uLED display panels typically emit unpolarized light, so only half of the light emitted would pass through the imaging system. The other half would reflect at the initial interception of the PBS element 820, and then be sent away from the PBS element 820. For this device, a single PBS layer 824 might be used and no collector or input linear polarizer is required for operation. An organic LED (OLED) display panel could be used in exactly the same way.

Another option is the use a DLP® display panel made by Texas Instruments of Dallas, Tex. Much like the LCoS display panel, the DLP® display panel is a spatial light modulator and does not emit light from the panel. It requires an external source of light. DLP® display panels require illumination that arrives off-axis to the display panel. The DLP® mirrors tilt in one direction to shift light into the projection lens (a bright pixel), and tilt in the opposite direction to direct light away from the projection lens (a dark pixel). If light is directed off-axis, passes through a linear polarizer into the illumination lower TIR prism 812, and add a quarter wave plate between the illumination lower TIR prism 812 and the DLP® display panel, then the system operates in the same manner as the LCoS system. By polarizing the illumination, the brightness of a typical DLP® projector is reduced by 2.

Figure 8D:
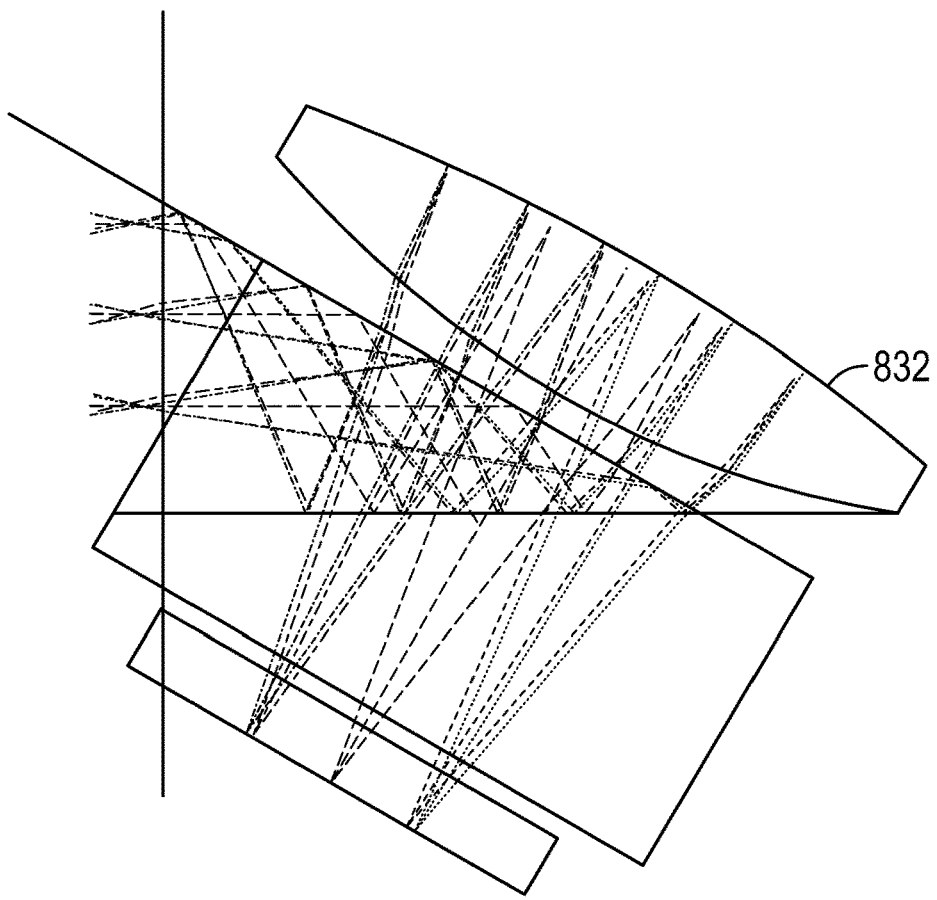
FIG. 8D illustrates a Mangin refractive lens coated on one side as mirror, with a diffractive element to achromatize the image.

Referring to FIG. 8D, there is illustrated the lens 832 comprising a Mangin refractive lens coated on one side as mirror 834, with a diffractive element to achromatize the image. The lens 832 could also be a combination of a single lens and a negative dispersion Liquid Crystal Polymer phase lens to achromatize the image.

Figure 8E:
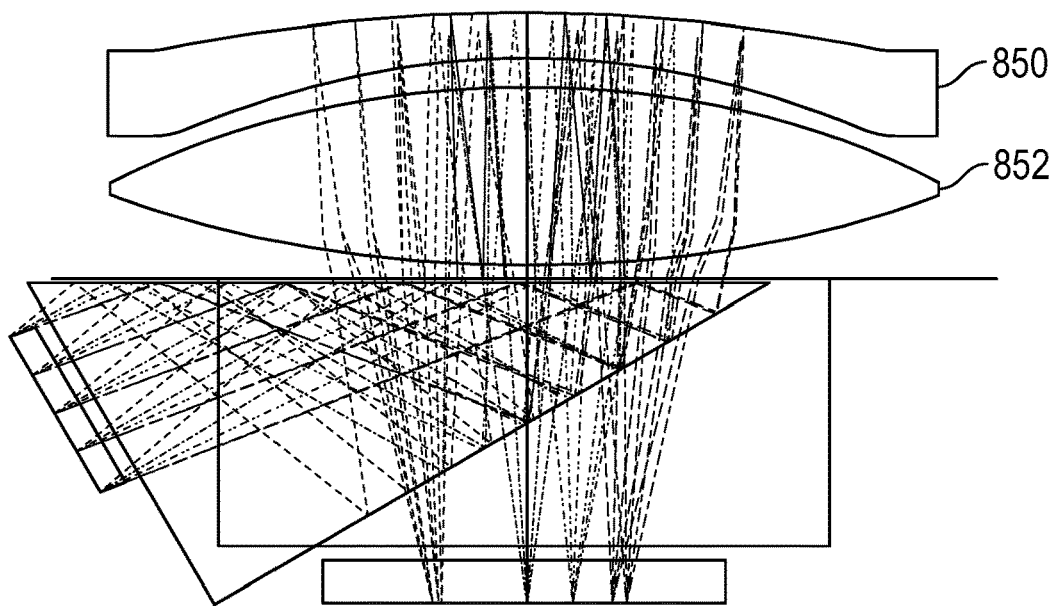
FIG. 8E illustrates the refractive lens including two elements configured to achromatize the image.

FIG. 8E illustrates lens 832 including two elements configured to achromatize the image, one a crown glass 850 and the other a flint glass 852.

Figure 8F:
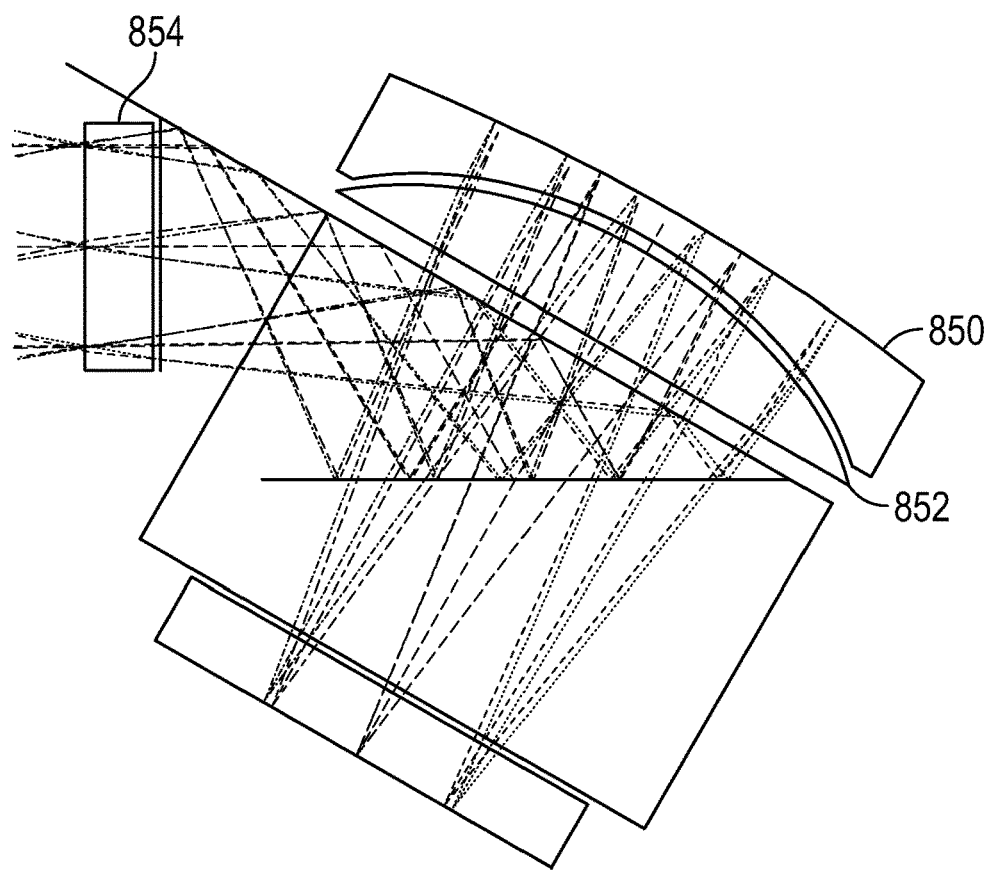
FIG. 8F illustrates the two elements configured to achromatize the image and a pupil lens near the input coupler.

FIG. 8F illustrates the two elements 850 and 852 configured to achromatize the image and a pupil lens 854 near the input coupler. The pupil lens 854 improves the Modulation Transfer Function (MTF) of the imaging system.

Figure 8G:
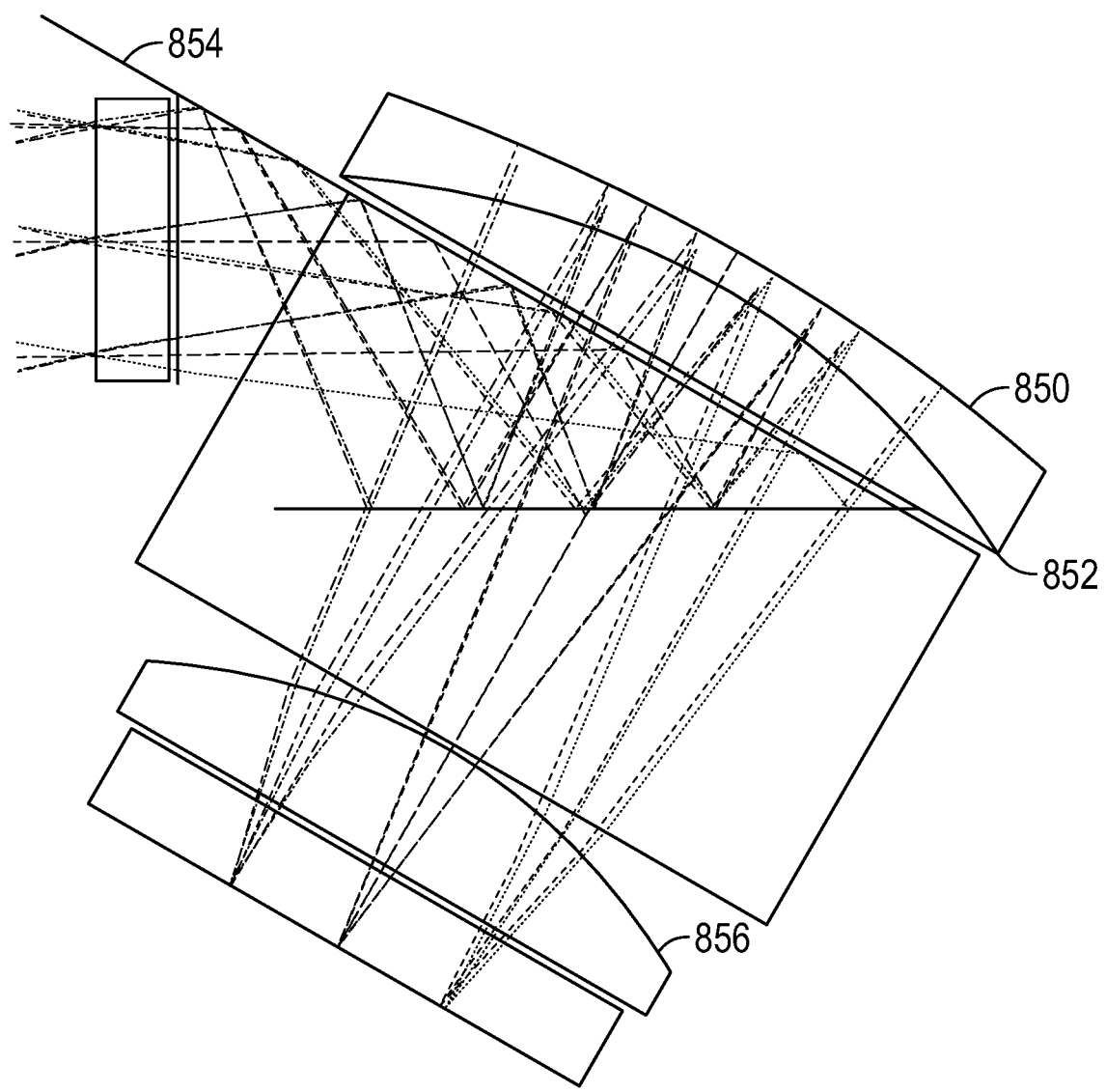
FIG. 8G illustrates the two elements configured to achromatize the image, the pupil lens near the input coupler, and a field lens near the LCoS panel.

FIG. 8G illustrates the two elements 850 and 852 configured to achromatize the image, the pupil lens 854 near the input coupler, and a field lens 856 near the LCoS panel 802. The addition of the field lens 856 improves the radial distortion of the imaging system.

Figure 8H:
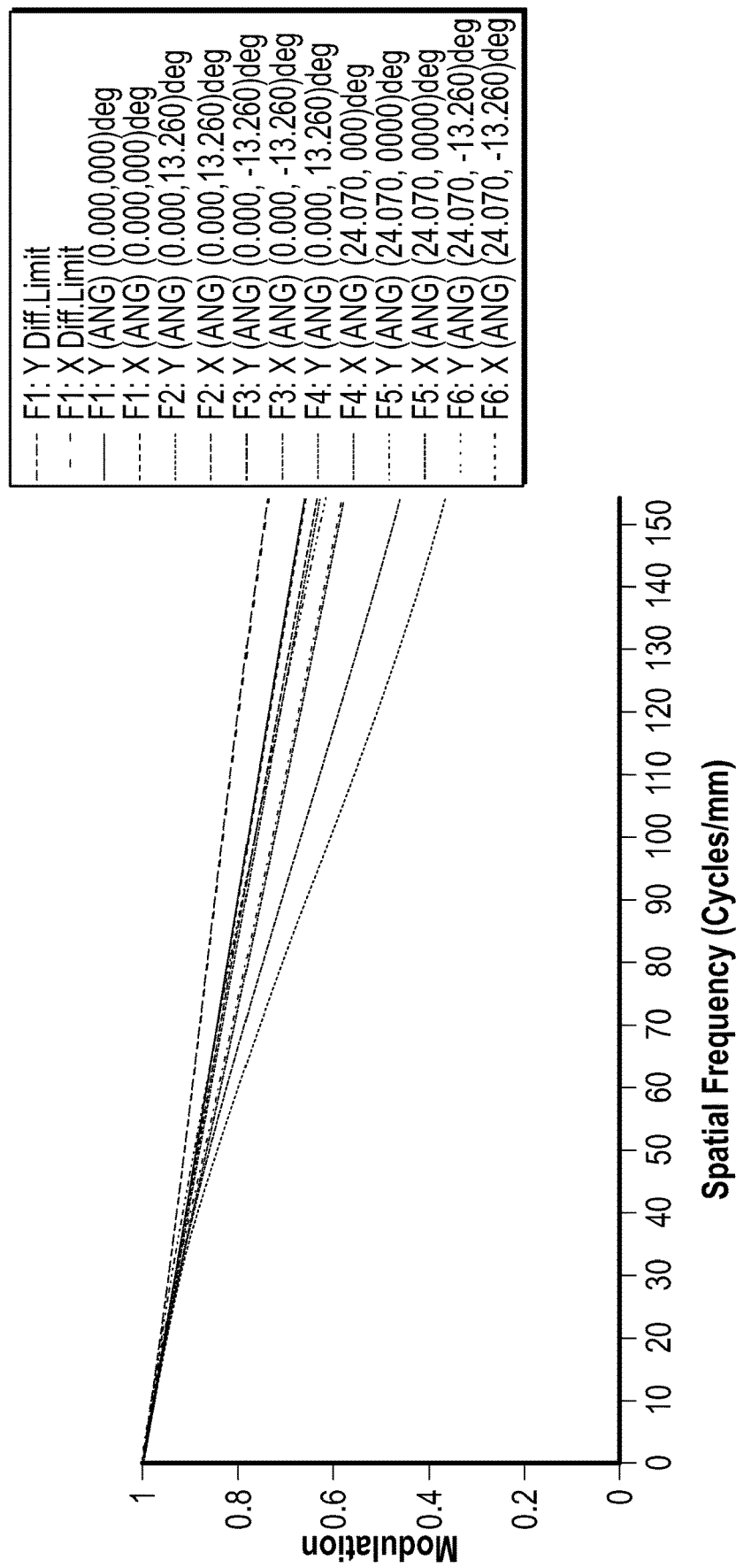
FIG. 8H illustrates an example MTF produced by the system depicted in FIG. 8G.

FIG. 8H illustrates an example MTF produced by the system depicted in FIG. 8G. In this example, the Nyquist frequency of the pixelated panel is 166 cycles per millimeter, and all field points are above 0.35 modulation contrast.

Figure 8I:
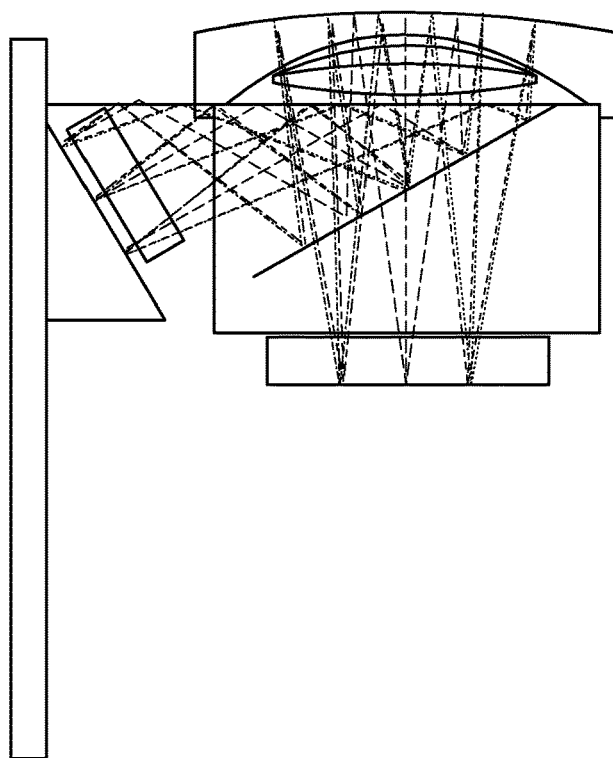
FIG. 8I illustrates a turning prism as an input coupler to the waveguide.

FIG. 8I illustrates a turning prism as an input coupler to the waveguide.

Figure 8J:
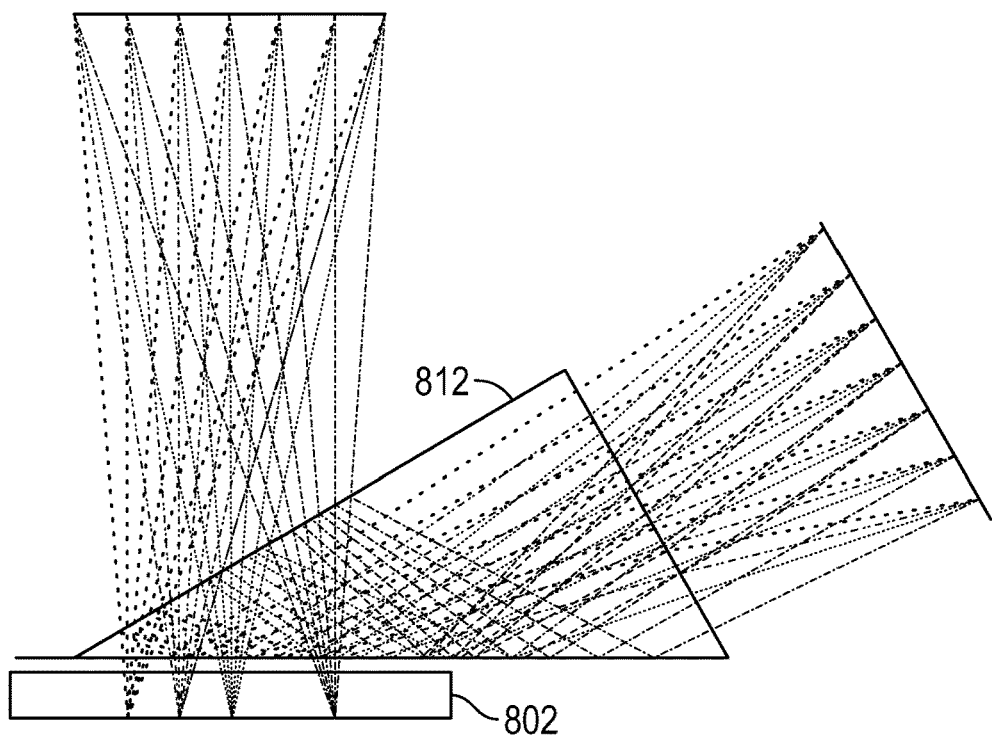
FIG. 8J illustrates a non-telecentric pupil, panel, and light path through illumination lower TIR prism.

FIG. 8J illustrates a non-telecentric pupil, panel, and light path through illumination lower TIR prism 812. A telecentric pupil is located at a very far position (essentially infinity) from the pixelated panel 802. A non-telecentric pupil is located at a finite distance from the panel 802. By creating a non-telecentric pupil in the imaging portion of the device, the beam footprint through the illumination lower prism 812 is reduced, and therefore reduces the size of the illumination lower prism 812.

Figure 8K:
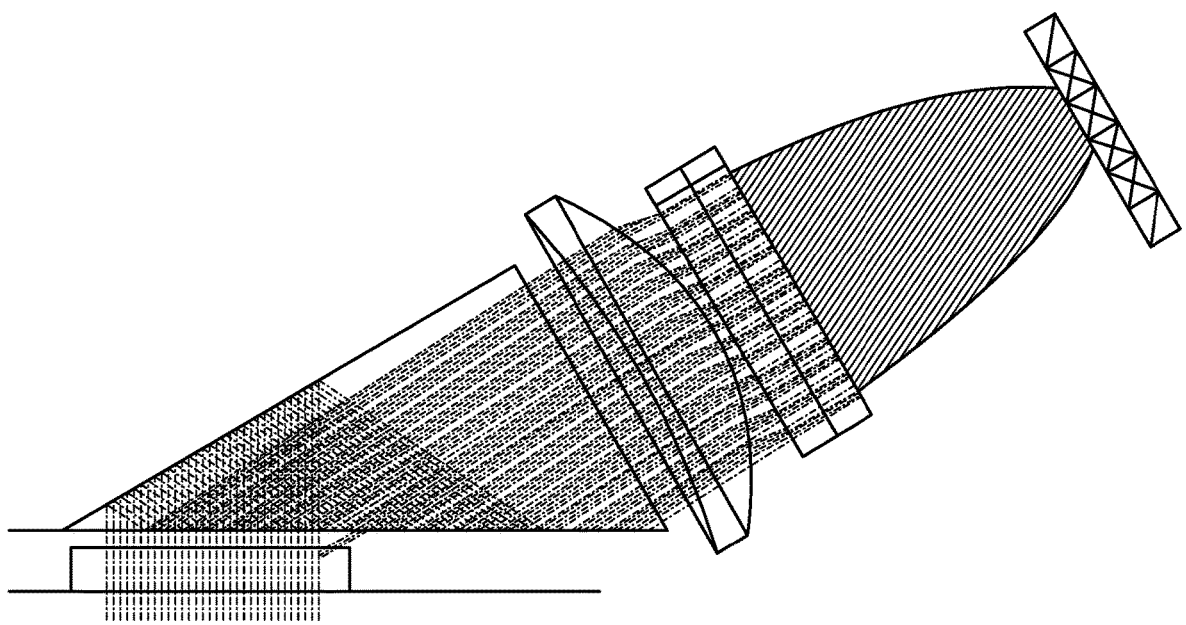
FIG. 8K illustrates an illumination system (non-telecentric pupil) utilizing an LED, CPC, microlens array, Fourier lens, illumination prism and a LCoS panel.

FIG. 8K illustrates an illumination system (non-telecentric pupil) utilizing an LED, Compound Parabolic Concentrator (CPC), microlens array, Fourier lens, illumination prism and a LCoS panel.

Figure 8L:
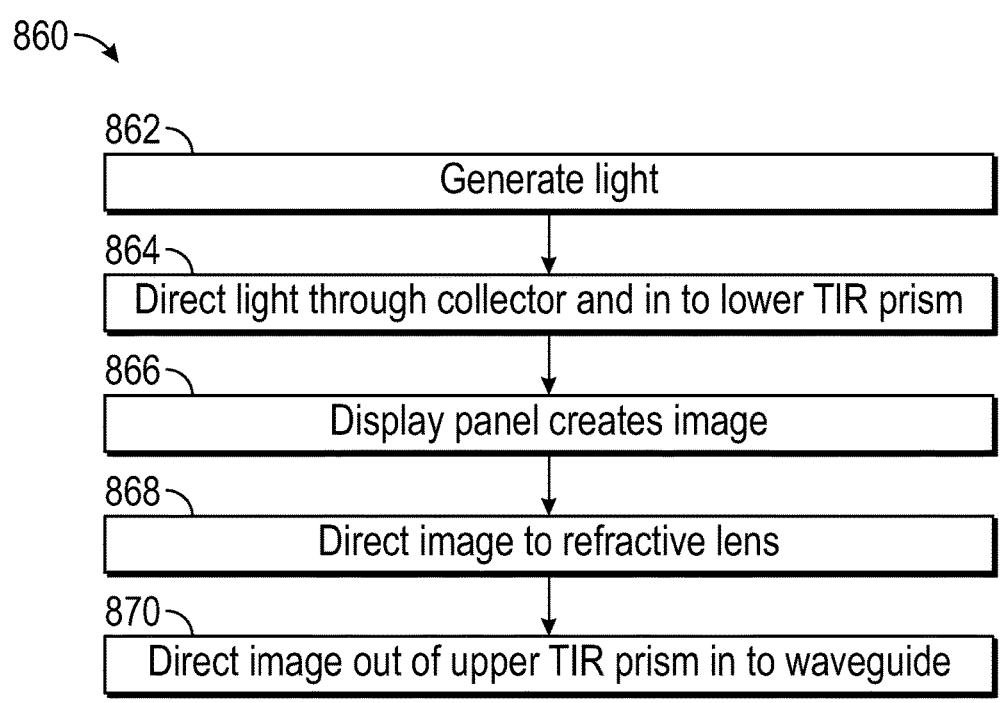
FIG. 8L illustrates a method of using the projector.

FIG. 8L illustrates a method 860 of using the projector 150.

At block 862, the light source 804 is controlled by processor 932 and generates light 806. The light source 804 generates red, green and blue (RGB) light 806 at different times, such as alternately or sequentially.

At block 864 the light 806 is directed through the collector 808 and the linear polarizer 810, and then into the right face of the lower TIR prism 812. The light 806 then reflects off the lower edge 814 of the lower TIR prism 812, and toward the PBS beamsplitter 816. The PBS beamsplitter 820 is s-polarized (instead of p-polarized). The PBS element 820 reflects the s-polarized light 806 and directs it to the LCoS panel 802 which is controlled by processor 932.

At block 866 the LCoS panel 802 is controlled by the processor 932 and modulates the received light 806 to create an image. The LCoS panel 802 operates as a quarter wave plate (QWP) and mirror when pixels of the LCoS panel 802 are set to the bright state. In this case, s-polarized light 806 enters the LCoS panel 802, is rotated by the QWP and mirror to the orthogonal p-state, and then is directed back to the PBS element 820. The PBS element 820 transmits the p-state light and passes it to an upper TIR prism 822.

At block 868 the image from the LCoS panel is directed to through the upper edge 836 of the upper TIR prism 822 and through the quarter-wave plate 830 to the refractive lens 832. The refractive lens 832 achromatizes the image. The refractive lens 832 has a mirror coating 834 on the backside of the lens 832 to act as a mirror, such as a Mangin lens. The quarter-wave plate 830 changes the state of the light 806 from linear to circular. The circularly polarized light 806 changes handedness upon reflection at the mirror 834, and then travels back to the quarter-wave plate 830, gathering geometric optical power as it propagates. This catadioptric lens serves as the projection lens.

At block 870 the circularly polarized light 806 passes again through the quarter-wave plate 830 and becomes s-polarized light. The s-polarized light reflects at the PBS element 820 and is sent to the upper edge 836 of the upper TIR prism 822. The light 806 then reflects at the upper edge 836 and is sent out the exit port 838 of the upper TIR prism 822, through the input coupler 842, and into the waveguide 844.

FIG. 9 depicts a high-level functional block diagram including example electronic components disposed in eyewear 100 and 200. The illustrated electronic components include the processor 932, the memory 934, and the see-through image display 180C and 180D.

Memory 934 includes instructions for execution by processor 932 to implement functionality of eyewear 100/200, including instructions for processor 932 to control in the image 715. Processor 932 receives power from battery 950 and executes the instructions stored in memory 934, or integrated with the processor 932 on-chip, to perform functionality of eyewear 100/200, and communicating with external devices via wireless connections.

A user interface adjustment system 900 includes a wearable device, which is the eyewear device 100 with an eye movement tracker 213 (e.g., shown as infrared emitter 215 and infrared camera 220 in FIG. 2B). User interface adjustments system 900 also includes a mobile device 990 and a server system 998 connected via various networks. Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 includes at least two visible light cameras 114A-B (one associated with the left lateral side 170A and one associated with the right lateral side 170B). Eyewear device 100 further includes two see-through image displays 180C-D of the optical assembly 180A-B (one associated with the left lateral side 170A and one associated with the right lateral side 170B). Eyewear device 100 also includes image display driver 942, image processor 912, low-power circuitry 920, and high-speed circuitry 930. The components shown in FIG. 9 for the eyewear device 100 and 200 are located on one or more circuit boards, for example a PCB or flexible PCB, in the temples. Alternatively, or additionally, the depicted components can be located in the temples, frames, hinges, or bridge of the eyewear device 100 and 200. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming implements the user interface field of view adjustment instructions, including, to cause the eyewear device 100 to track, via the eye movement tracker 213, the eye movement of the eye of the user of the eyewear device 100. Other implemented instructions (functions) cause the eyewear device 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 934 to present the sequence of displayed images, including the initial displayed image with the initial field of view and the successive displayed image with the successive field of view.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays 180C-D of the optical assembly 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

Low-power wireless circuitry 924 and the high-speed wireless circuitry 936 of the eyewear device 100 and 200 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, color maps, camera data generated by the left and right visible light cameras 114A-B and the image processor 912, as well as images generated for display by the image display driver 942 on the see-through image displays 180C-D of the optical assembly 180A-B. While memory 934 is shown as integrated with high-speed circuitry 930, in other examples, memory 934 may be an independent standalone element of the eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Server system 998 may be one or more computing devices as part of a service or network computing system, for example, that include a processor, a memory, and network communication interface to communicate over the network 995 with the mobile device 990 and eyewear device 100/200. Eyewear device 100 and 200 is connected with a host computer. For example, the eyewear device 100 is paired with the mobile device 990 via the high-speed wireless connection 937 or connected to the server system 998 via the network 995.

Output components of the eyewear device 100 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 942. The output components of the eyewear device 100 further include acoustic components (e.g., speakers), haptic components (e.g., a vibratory motor), other signal generators, and so forth. The input components of the eyewear device 100 and 200, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include ambient light and spectral sensors, biometric sensors, additional sensors, or display elements integrated with eyewear device 100. For example, peripheral device elements may include any I/O components including output components, motion components, position components, or any other such elements described herein. The eyewear device 100 can take other forms and may incorporate other types of frameworks, for example, a headgear, a headset, or a helmet.

For example, the biometric components of the user interface field of view adjustment 900 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

According to some examples, an "application" or "applications" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third-party application can invoke API calls provided by the operating system to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A prism, comprising:
   a first total internal reflection (TIR) prism configured to route light from a light source to a display;
   a second TIR prism coupled to the first TIR prism at an interface and configured to route the light from the display;
   a polarizing beamsplitter disposed at the interface between the first and second TIR prisms;
   a quarter-wave plate configured to receive the light from the second TIR prism;
   a lens configured to reflect the light passing through the quarter-wave plate back into the second TIR prism; and
   the second TIR prism configured to direct the reflected light from the lens to an output that is configured to couple to a waveguide.

2. The prism of claim 1, wherein the lens comprises a refractive lens.

3. The prism of claim 2, wherein the refractive lens comprises a first lens and a mirror configured to achromatize an image.

4. The prism of claim 2, wherein the refractive lens is configured to form a Fourier transform of the light.

5. The prism of claim 1, wherein the polarizing beamsplitter is configured to reflect and polarize the light.

6. The prism of claim 5, wherein the polarizing beamsplitter is configured to reflect light of one linear polarization and transmit light of an orthogonal linear polarization.

7. The prism of claim 1 further comprising a collector disposed between the light source and the first TIR prism.

8. The prism of claim 1, further comprising a polarizer coupled to the second TIR prism output.

9. The prism of claim 1, wherein the polarizing beamsplitter comprises of two layers sandwiching a linear polarizer.

10. A prism, comprising:
a first total internal reflection (TIR) prism configured to route an image;
a second TIR prism coupled to the first TIR prism at an interface and configured to route the image from the first TIR prism;
a polarizing beamsplitter disposed at the interface between the first and second TIR prisms;
a quarter-wave plate configured to receive the image from the second TIR prism;
a lens configured to reflect the image passing through the quarter-wave plate back into the second TIR prism; and
the second TIR prism configured to direct the image from the lens to an output that is configured to couple to a waveguide.

11. A method of use of a prism, comprising:
routing light from a light source using a first total internal reflection (TIR) prism;
routing the light from the first TIR prism using a second TIR prism coupled to the first TIR prism at an interface, wherein a polarizing beamsplitter is disposed at the interface between the first and second TIR prisms;
receiving the light from the second TIR prism at a quarter-wave plate;
reflecting the light passing through the quarter-wave plate back into the second TIR prism with a lens; and
directing the reflected light with the second TIR prism from the lens to an output that is configured to couple to a waveguide.

12. The method of claim 11, wherein the lens comprises a refractive lens.

13. The method of claim 12, wherein the refractive lens comprises a first lens and a mirror achromatizing an image.

14. The method of claim 12, wherein the refractive lens forms a Fourier transform of the light.

15. The method of claim 11, wherein the polarizing beamsplitter reflects and polarizes the light.

16. The method of claim 15, wherein the polarizing beamsplitter reflects light of one linear polarization and transmits light of an orthogonal linear polarization.

17. The method of claim 11 further comprising a collector disposed between the light source and the first TIR prism.

18. The method of claim 11, further comprising a polarizer coupled to the second TIR prism output.

19. The method of claim 11, wherein the polarizing beamsplitter comprises of two layers sandwiching a linear polarizer.

20. The method of claim 12, wherein the refractive lens comprises a crown glass and a flint glass.

* * * * *